United States Patent [19]
Hasegawa et al.

[11] Patent Number: 5,540,209
[45] Date of Patent: Jul. 30, 1996

[54] AIR-FUEL RATIO DETECTION SYSTEM FOR INTERNAL COMBUSTION ENGINE

[75] Inventors: Yusuke Hasegawa; Yoichi Nishimura; Isao Komoriya; Shusuke Akazaki; Eisuke Kimura; Satoru Abe; Kei Machida, all of Wako, Japan

[73] Assignee: Honda Giken Kogyo Kabushiki Kaisha, Tokyo, Japan

[21] Appl. No.: 305,279

[22] Filed: Sep. 13, 1994

[30] Foreign Application Priority Data

Sep. 13, 1993 [JP] Japan .................................. 5-251141
Feb. 4, 1994 [JP] Japan .................................. 6-033199

[51] Int. Cl.$^6$ .................................................. F02D 41/00
[52] U.S. Cl. .................................................. 123/679
[58] Field of Search ................................ 123/679, 488

[56] References Cited

U.S. PATENT DOCUMENTS

| | | | |
|---|---|---|---|
| 4,494,512 | 1/1985 | Kishi et al. | 123/679 |
| 4,864,998 | 9/1989 | Onishi | 123/679 |
| 4,934,328 | 6/1990 | Ishii et al. | 123/679 |
| 4,943,924 | 7/1990 | Kanegae et al. | 123/679 |
| 5,040,513 | 8/1991 | Schnaibel et al. | 123/488 |
| 5,099,818 | 3/1992 | Takahashi et al. | 123/679 |
| 5,165,381 | 11/1992 | Mayashita et al. | 123/679 |
| 5,241,943 | 9/1993 | Miyashita et al. | 123/679 |
| 5,253,630 | 10/1993 | Akazaki et al. | 123/682 |
| 5,335,643 | 8/1994 | Abate et al. | 123/679 |
| 5,381,775 | 1/1995 | Birk et al. | 123/679 |

FOREIGN PATENT DOCUMENTS

| | | |
|---|---|---|
| 0553570A2 | 8/1993 | European Pat. Off. . |
| 59-101562 | 6/1984 | Japan . |
| 1-313644 | 12/1989 | Japan . |
| 2-275043 | 11/1990 | Japan . |
| 4-369471 | 12/1992 | Japan . |
| 5-180040 | 7/1993 | Japan . |

Primary Examiner—Raymond A. Nelli
Attorney, Agent, or Firm—Nikaido, Marmelstein, Murray & Oram LLP

[57] ABSTRACT

A system for detecting air-fuel ratio of an internal combustion engine by sampling outputs of an air-fuel ratio sensor installed at an exhaust system confluence point of said engine. A timing map is prepared to be retrieved by the engine speed and manifold absolute pressure to determine one among sampled data which are successively stored in buffers. It is selected such that as the engine speed decreases or the manifold absolute pressure increases, a datum sampled at earlier crank angular position is selected. At an engine equipped with a variable valve timing mechanism, a datum sampled at earlier crank angular position is selected in the valve timing is controlled for high engine speed provided that the engine speed and manifold absolute pressure is constant. The sampled data stored in the buffers may be transferred to another buffers at a predetermined crank angular position. The sampled data is corrected by an environmental conditions including atmospheric pressure, a mixture or sensor degradation. Each buffer may have a plurality of sampled data.

62 Claims, 32 Drawing Sheets

FIG.35

Manifold absolute pressure Pb

|  | Low | | | High |
|---|---|---|---|---|
| Low | 6, 7<br>8, 9 | | | 9, 10<br>11, 12 |
| Engine speed Ne | | | 4, 6<br>8, 10 | |
| | 5, 6<br>7 | | | 8, 8<br>10, 11 |
| High | 4, 5<br>6, 7 | | | 7, 8<br>9, 10 |

AIR-FUEL RATIO DETECTION SYSTEM FOR INTERNAL COMBUSTION ENGINE

BACKGROUND OF THE INVENTION

FIELD OF THE INVENTION

This invention relates to an air-fuel ratio detection system for an internal combustion engine, more particularly to an air-fuel ratio detection system for a multicylinder internal combustion engine which enables to select one among outputs of an air-fuel ratio sensor sampled at a timing most optimum under the engine operating conditions and based on the sampled datum, to detect the air-fuel ratio of the engine correctly.

DESCRIPTION OF THE PRIOR ART

It is a common practice to install an air-fuel ratio sensor at the exhaust system of an internal combustion engine to detect the air-fuel ratio at that location. A system of this type is taught by Japanese Laid-Open Patent Publication No. Sho 59(1984)-101,562, for example. Similarly, the assignee earlier proposed designing a model describing the behavior of the exhaust system and inputting the air-fuel ratio detected by an air-fuel ratio sensor disposed at the exhaust confluence point, and constructing an observer for estimating the air-fuel ratios at the individual cylinders from the confluence point air-fuel ratio. (Japanese Patent Application No. Hei 3-359338; Japanese Laid-open Patent Publication No. Hei 5-180040 which was filed in the United States under the number of U.S. Ser. No. 07/997,769 and in EPO under the number of 92311841.8). The sensor used there is not an $O_2$ sensor which produces an inverted output only in the vicinity of the stoichiometric air-fuel ratio, but a wide-range air-fuel ratio sensor which produces a detection output proportional to the oxygen concentration of the exhaust gas.

Moreover, Japanese Laid-open Patent Publication Hei 1-313,644 proposes a technique in which the appropriateness of air-fuel detection is checked at every predetermined crank angular position.

In the air-fuel ratio detection, since the remaining burned gas in the cylinder is swept out by a piston in the course of an exhaust stroke, the behavior of the air-fuel ratio at the exhaust system confluence point of a multicylinder internal combustion engine is conceived to be synchronous with the Top Dead Center crank position. When the aforesaid wide-range air-fuel ratio sensor is installed at the exhaust confluence point, it therefore becomes necessary to sample outputs of the sensor in synchronism with the TDC crank position. However, depending on the sampling timings, a control unit of the air-fuel detection system recognizes the air-fuel ratio as a different value. Specifically, assume that the actual air-fuel ratio at the exhaust confluence point relative to the TDC crank position is that as illustrated in FIG. 36. As illustrated in FIG. 37, the air-fuel ratio sampled at inappropriate timings is recognized by the control unit as quite different from that sampled at appropriate (best) timings. The sensor outputs should preferably be sampled at a timing which is able to reflect the change of the sensor output faithfully, in other words, the sensor outputs should preferably be sampled at a timing as close as possible to a turning point such as a peak of sensor outputs.

Further, the air-fuel ratio changes differently by the length of the arrival time at which the exhaust gas reaches the sensor or of the reaction time of the sensor. The length of the arrival time varies depending such as on the pressure or volume of the exhaust gas. Furthermore, since, to sample sensor outputs in synchronism with the TDC crank position means to conduct sampling on the basis of crank angular position, the sampling is not free from engine speed. Thus, the detection of air-fuel ratio greatly depends on the operating conditions of the engine. For that reason, the aforesaid prior art system discriminates at every predetermined crank angular position as to whether not the detection is appropriate. The prior art system is, however, complicated in structure and disadvantageous in that the discrimination becomes presumably impossible at a high engine speed since it require a long calculation time. Still less, there is the likelihood that, when the suitable detection timing is determined, the turning point of the sensor output has already been expired.

This invention was accomplished in view of the foregoing problems and has as its object to provide an air-fuel detection system for an internal combustion engine which is simple in structure and enables to sample outputs of a wide-range air-fuel ratio sensor at an optimum timing so as to detect the datum that reflects the actual behavior of the air-fuel ratio faithfully, whereby enhancing detection accuracy.

Further, when conducting a calculation based on the sampled data, it may sometimes happen a case in which it becomes impossible to finish the calculation in a scheduled period due to the change in engine speed or the like.

Therefore, another object of the invention is to provide an air-fuel ratio detection system for an internal combustion engine which enables to ensure optimum sampling or detection accuracy at such an instance.

Furthermore, there has been proposed a mechanism which switches the valve timing in response to the operating conditions of the engine such as taught by Japanese Laid-open Patent Publication 2-275,043. In such a variable valve timing mechanism, in particularly in the mechanism which switches the exhaust valve timing, the behavior of the air-fuel ratio presumably varies, since the exhaust timing, if switched, varies.

Therefore, still another object of the invention is to provide an air-fuel ratio detection system for an internal combustion engine equipped with the variable valve timing mechanism which enables to ensure the optimum sampling or detection accuracy when the valve timing is switched.

Furthermore, when the vehicle travels high altitudes, the pressure in the exhaust system of the engine becomes lower than that at a low land due to the atmospheric pressure drop, which makes the exhaust gas pressure greater. This influences on the behavior of the air-fuel ratio.

Therefore, yet still another object of the invention is to provide an air-fuel ratio detection system for an internal combustion engine which enables to ensure optimum sampling or detection accuracy when the vehicle on which the engine is mounted on travels at high altitudes.

Furthermore, the reaction time of the air-fuel ratio sensor varies depending on the situation whether an air-fuel mixture is lean or not. The same applies when the air-fuel ratio sensor becomes degraded.

Therefore, yet still another object of the invention is to provide an air-fuel ratio detection system for an internal combustion engine which enables to ensure optimum sampling or detection accuracy when the mixture is lean or when the air-fuel ratio sensor becomes degraded.

Furthermore, there is the possibility that the sample timing considered to be best at the operating condition of the engine may shift due to the sudden change of the engine operating condition or the like.

Therefore, yet still another object of the invention is to provide an air-fuel ratio detection system for an internal combustion engine which enables to ensure optimum sampling or detection accuracy even when the engine operating conditions changes suddenly.

For realizing these objects, the present invention provides a system for detecting air-fuel ratio of an internal combustion engine by sampling outputs of an air-fuel ratio sensor installed at an exhaust system of said engine, comprising, first means for detecting operating condition of said engine, second means for successively sampling said outputs of said air-fuel ratio sensor, third means for successively storing said sampled datum in a memory, fourth means for selecting one among said sampled data in response to said detected operating condition of said engine, and fifth means for detecting said air-fuel ratio of said engine based on said selected sampled datum.

BRIEF DESCRIPTION OF THE DRAWINGS

These and other objects and advantages of the invention will be more apparent from the following description and drawings, in which:

FIG. 35 is an explanatory view showing the characteristics of a timing map referred to in the flowchart of FIG. 34;

DETAILED DESCRIPTION OF THE PREFERRED EMBODIMENTS

Figure 1:
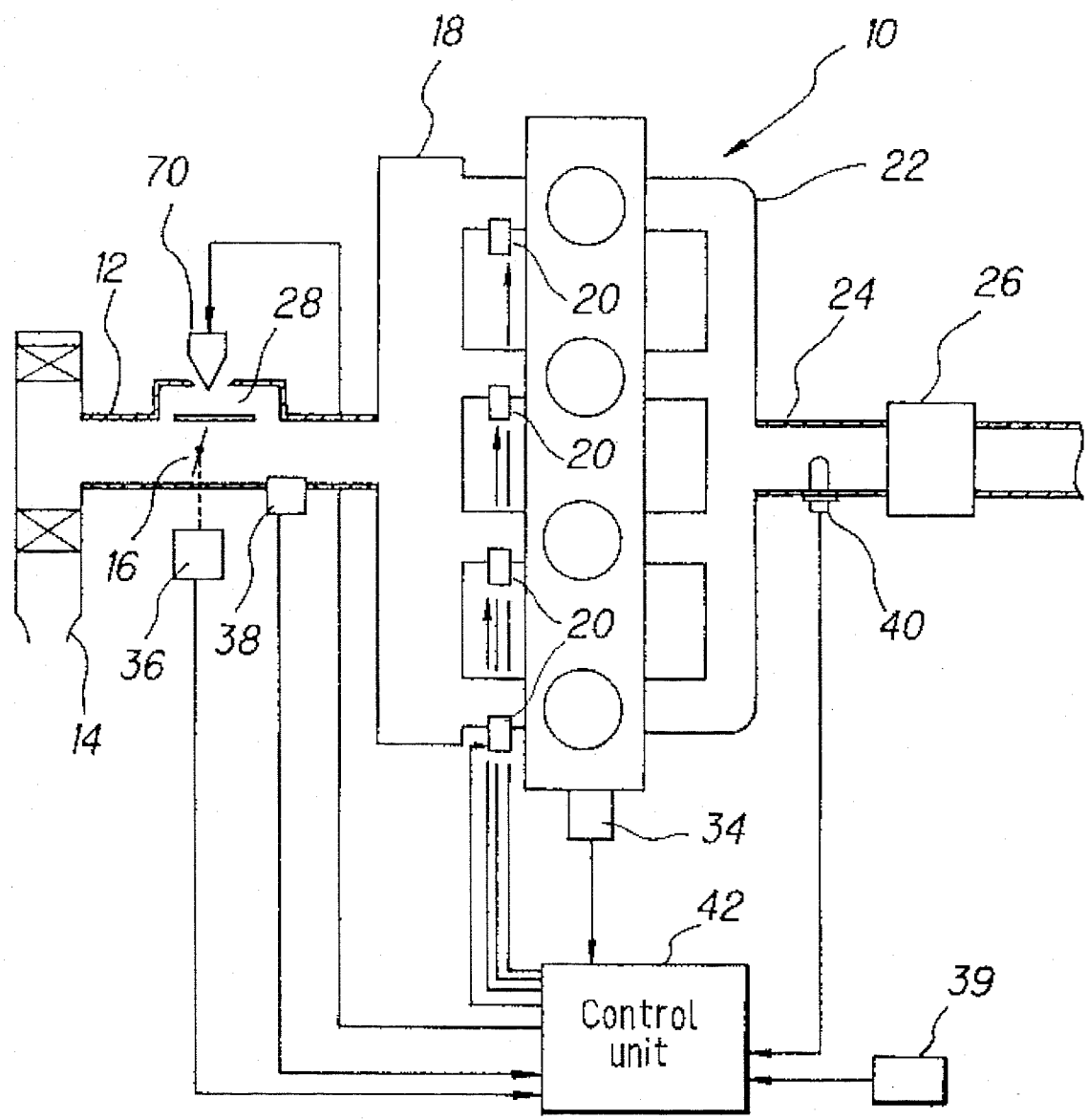
FIG. 1 is an overall schematic view of an air-fuel ratio detection system for an internal combustion engine according to the present invention.

FIG. 1 is an overall schematic view of an air-fuel ratio detection system for an internal combustion engine according to this invention. Reference numeral 10 in this figure designates a four-cylinder internal combustion engine. Air drawn in through an air cleaner 14 mounted on the far end of an air intake passage 12 is supplied to the first to fourth cylinders through an intake manifold 18 while the flow thereof is adjusted by a throttle valve 16. An injector 20 for injecting fuel is installed in the vicinity of an intake valve (not shown) of each cylinder. The injected fuel mixes with the intake air to form an air-fuel mixture that is ignited in the associated cylinder by a spark plug (not shown). The resulting combustion of the air-fuel mixture drives down a piston (not shown). The exhaust gas produced by the combustion is discharged through an exhaust valve (not shown) into an exhaust manifold 22, from where it passes through an exhaust pipe 24 to a three-way catalytic converter 26 where it is removed of noxious components before being discharged to the exterior. In addition, the air intake path 12 is bypassed by a bypass 28 provided therein in the vicinity of the throttle valve 16.

A crankangle sensor 34 for detecting the piston crank angles is provided in an ignition distributor (not shown) of the internal combustion engine 10. The crankangle sensor produces a TDC signal at every TDC crank position and a CRK signal at every 15 crank angles (such a predetermined range of crank angles is hereinafter referred to as "stage") obtained by dividing the TDC interval by 12. And a throttle position sensor 36 is provided for detecting the degree of opening of the throttle valve 16, and a manifold absolute pressure sensor 38 is provided for detecting the pressure of the intake air downstream of the throttle valve 16 as an absolute pressure. Additionally, an atmospheric pressure sensor 39 is provided at an appropriate location of the engine for detecting the atmospheric pressure of a place at which the engine is.

A wide-range air-fuel ratio sensor 40 constituted as an oxygen concentration detector is provided at a confluence point in the exhaust system between the exhaust manifold 22 and the three-way catalytic converter 26, where it detects the oxygen concentration of the exhaust gas at the confluence point and produces an output proportional thereto over a broad range extending from the lean side to the rich side. As this wide-range air-fuel ratio sensor is explained in detail in the assignee's Japanese Patent Application No. Hei 3-169456 (Japanese Laid-open Patent Publication No. Hei 4-369471 which was filed in the United States under the number of Ser. No. 07/878,596), it will not be explained further here. Hereinafter in this explanation, the air-fuel ratio sensor will be referred to as an LAF sensor (linear A-by-F sensor). The outputs of the crankangle sensor 34 and other sensors are sent to a control unit 42.

Figure 2:
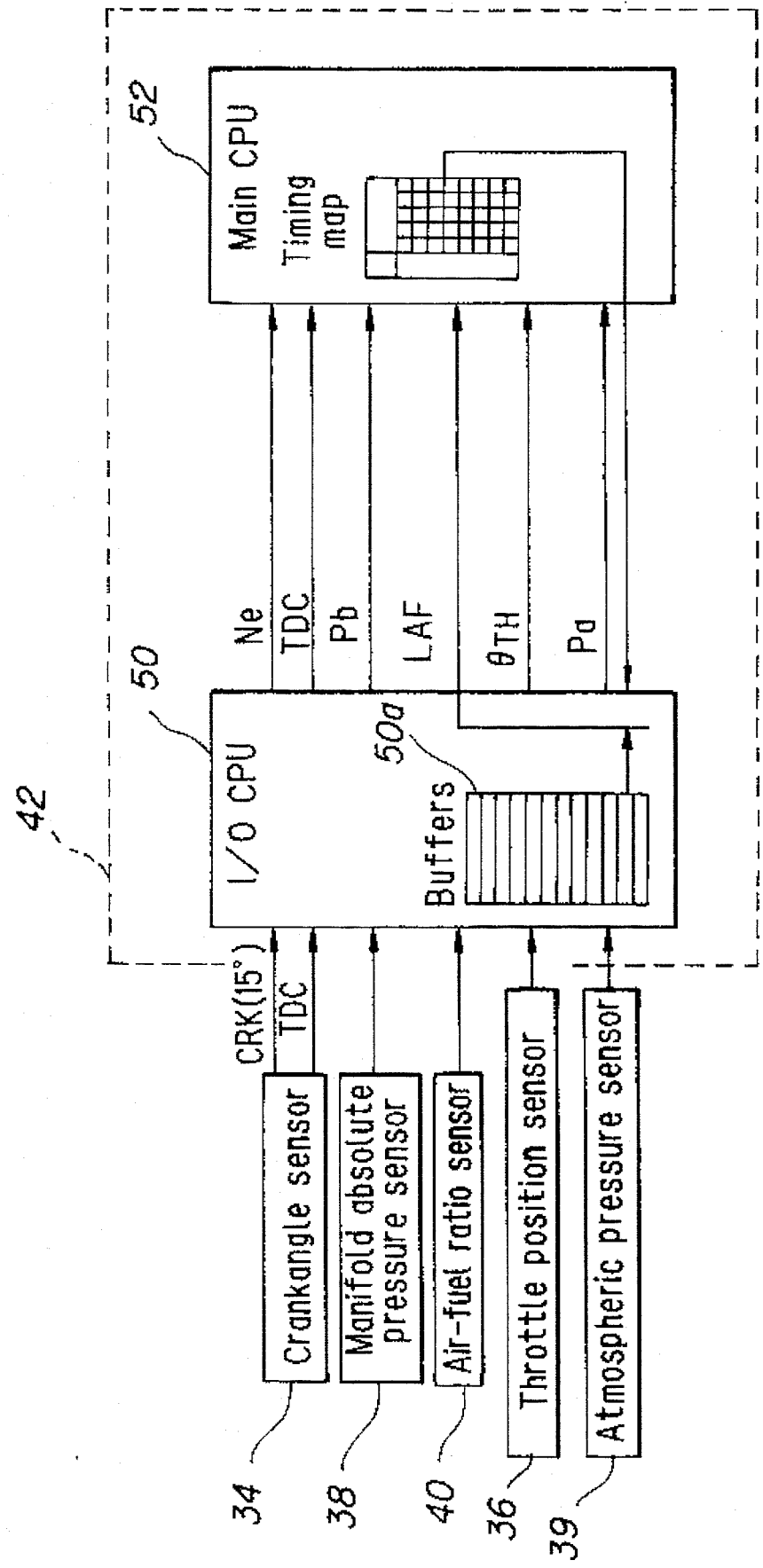
FIG. 2 is a block diagram showing the details of a control unit illustrated in FIG. 1.

Details of the control unit 42 are shown in the block diagram of FIG. 2 focussing on the air-fuel ratio detection. As illustrated, the control unit 42 has an input/out CPU (Central Processing Unit) 50 (hereinafter referred to as "I/O CPU 50") for input/output control and a main CPU 52 for the air-fuel ratio detection. The I/O CPU 50 receives the TDC signal and CRK signal generated by the crankangle sensor 34, and signals generated by the throttle position sensor 36, the manifold absolute pressure sensor 38, the atmospheric pressure sensor 39 and the LAF sensor 40. The I/O CPU 50 counts the number of the CRK signals from the crankangle sensor 34 and generates and forwards a signal indicative of engine speed Ne to the main CPU 52. The I/O CPU 50 is provided with an A/D converter (not shown) and successively converts the analogue outputs from the throttle position sensor 36, the manifold absolute sensor 38, the atmospheric pressure sensor 39 and the LAF sensor 40 into digital values. The I/O CPU 50 immediately sends the digital values indicative of the throttle opening degree θTH, the manifold absolute pressure Pb, and the atmospheric pressure Pa to the main CPU 52. The I/O CPU 50 has 12 buffers (memories) 50a and stores the digital value of the LAF sensor output (hereinafter referred to as "LAF") to the buffers 50a each time the CRK signal is input from the crankangle sensor 34. Namely, the I/O CPU 50 stores the value LAF at each stage obtained by the TDC interval (180 crank angles) of the four cylinder engine by 12. The 12 buffers 50a are assigned with numbers (No. 1 to No. 11) and are identified.

Figure 3:
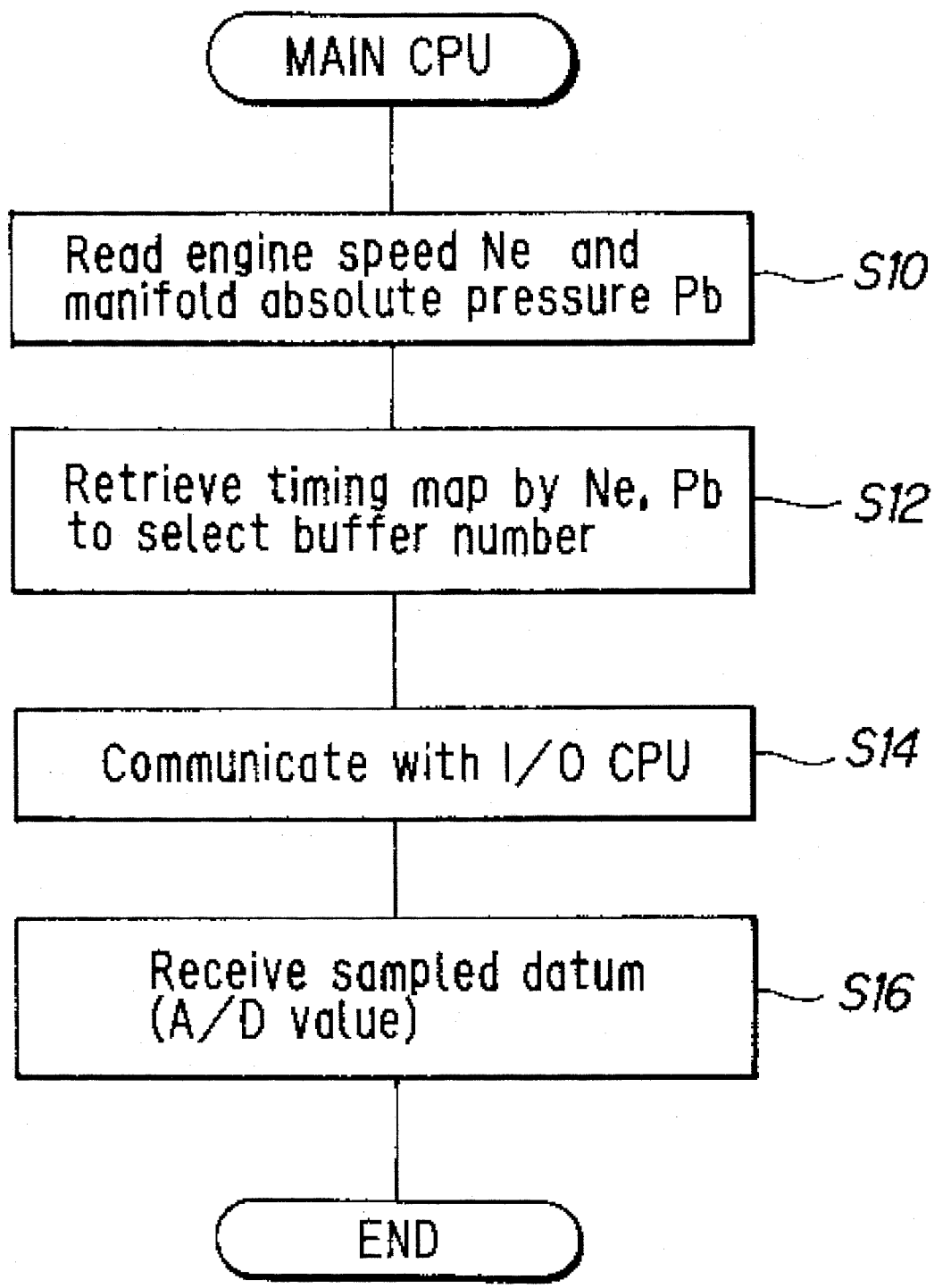
FIG. 3 is a flowchart showing the operation of the air-fuel ratio detection system for internal combustion engine illustrated in FIG. 1.

The operation of the system is shown by the flowchart of FIG. 3. For facilitating an understanding of the invention, however, the earlier proposed model describing the behavior of an exhaust system will be explained first.

Figure 4:
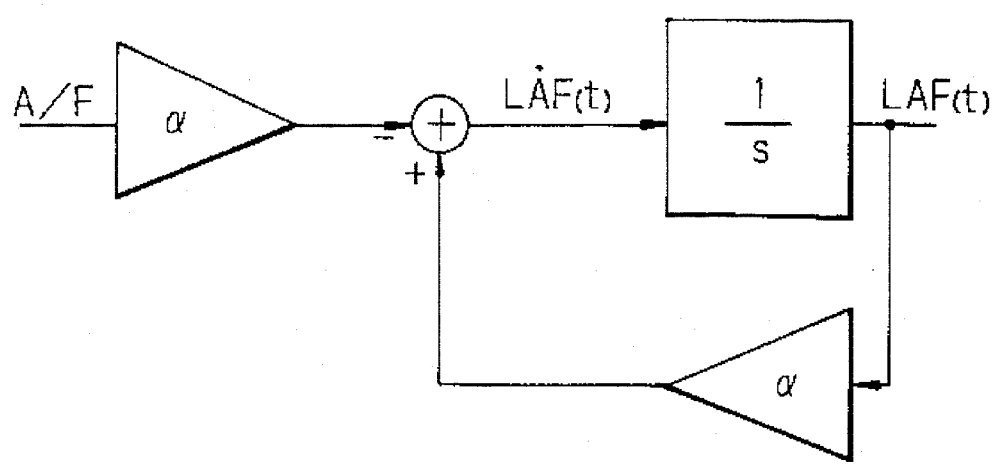
FIG. 4 is a block diagram showing a model describing the behavior of detection of an air-fuel ratio referred to in the assignee's earlier application.

For high-accuracy separation and extraction of the air-fuel ratios of the individual cylinders from the output of a single LAF sensor it is first necessary to accurately ascertain the detection response delay (lag time) of the LAF sensor. The inventors therefore used simulation to model this delay as a first-order lag time system. For this they designed the model shown in FIG. 4. Here, if we define LAF: LAF sensor output and A/F: input air-fuel ratio, the state equation can be written as $$LAF(t)=\alpha LAF(t)-\alpha A/F(t) \tag{1}$$

When this is discretized for period delta T, we get $$LAF(k+1)=\hat{\alpha}LAF(k)+(1-\hat{\alpha})A/F(k) \tag{2}$$

Here, $\hat{\alpha}$ is a correction coefficient and is defined as:

$$\hat{\alpha}=1+\alpha\Delta T+(1/2!)\alpha^2\Delta T^2+(1/3!)\alpha^3\Delta T^3+(1/4!)\alpha^4\Delta T^4$$

Figure 5:
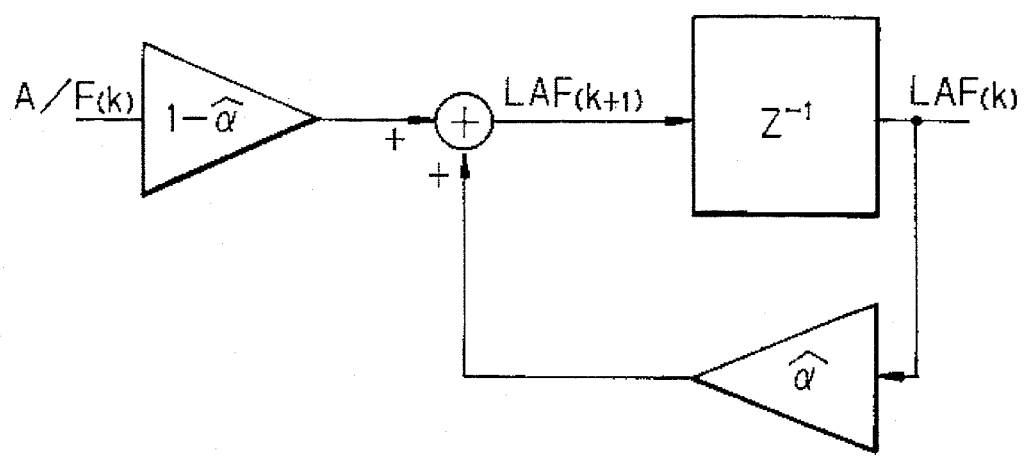
FIG. 5 is a block diagram showing the model of FIG. 4 discretized in the discrete-time series for period delta T.

Equation 2 is represented as a block diagram in FIG. 5.

Therefore, Equation 2 can be used to obtain the actual air-fuel ratio from the sensor output. That is to say, since Equation 2 can be rewritten as Equation 3, the value at time k−1 can be calculated back from the value at time k as shown by Equation 4.

$$A/F(k)=\{LAF(k+1)-\hat{\alpha}LAF(k)\}/(1-\hat{\alpha}) \tag{3}$$

$$A/F(k-1)=\{LAF(k)-\hat{\alpha}LAF(k-1)\}/(1-\hat{\alpha}) \tag{4}$$

Figure 6:
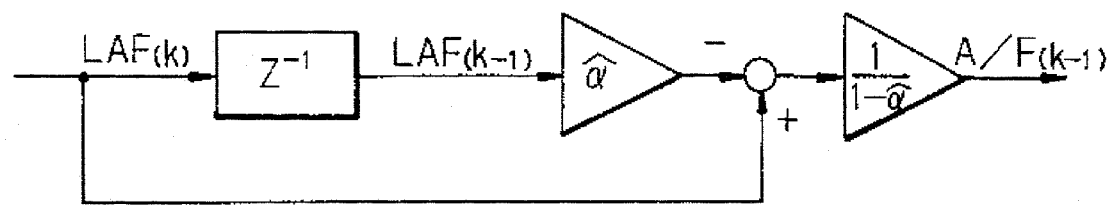
FIG. 6 is a block diagram showing a real-time air-fuel ratio estimator based on the model of FIG. 5.

Specifically, use of Z transformation to express Equation 2 as a transfer function gives Equation 5, and a real-time estimate of the air-fuel ratio input in the preceding cycle can be obtained by multiplying the sensor output LAF of the current cycle by the inverse transfer function and the correction coefficient $\hat{\alpha}$. FIG. 6 is a block diagram of the real-time air-fuel ratio estimator.

$$t(z)=(1-\hat{\alpha})/(Z-\hat{\alpha}) \tag{5}$$

The method for separating and extracting the air-fuel ratios of the individual cylinders based on the actual air-fuel ratio obtained in the foregoing manner will now be explained. If the air-fuel ratio at the confluence point of the exhaust system is assumed to be an average weighted to reflect the time-based contribution of the air-fuel ratios of the individual cylinders, it becomes possible to express the air-fuel ratio at the confluence point at time k in the manner of Equation 6. (As F (fuel) was selected as the manipulated variable, the fuel-air ratio F/A is used here. For easier understanding, however, the air-fuel ratio will be used in the explanation so far as such usage does not lead to problems. The term "air-fuel ratio" (or "fuel-air ratio") used herein is the actual value corrected for the response lag time calculated according to Equation 5.)

$$[F/A](k) = C_1[F/A\#_1] + C_2[F/A\#_3] + \\ C_3[F/A\#_4] + C_4[F/A\#_2] \quad (6)$$

$$[F/A](k+1) = C_1[F/A\#_3] + C_2[F/A\#_4] + \\ C_3[F/A\#_2] + C_4[F/A\#_1]$$

$$[F/A](k+2) = C_1[F/A\#_4] + C_2[F/A\#_2] + \\ C_3[F/A\#_1] + C_4[F/A\#_3]$$

⋮

Figure 7:
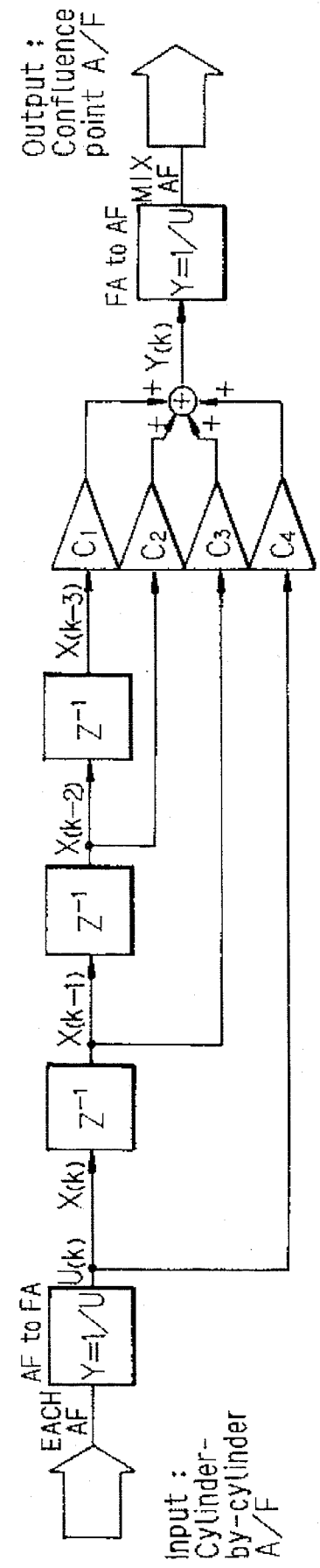
FIG. 7 is a block diagram showing a model describing the behavior of the exhaust system of the engine referred to in the assignee's earlier application.

More specifically, the air-fuel ratio at the confluence point can be expressed as the sum of the products of the past firing histories of the respective cylinders and weights C (for example, 40% for the cylinder that fired most recently, 30% for the one before that, and so on). This model can be represented as a block diagram as shown FIG. 7.

Its state equation can be written as $$\begin{pmatrix} x(k-2) \\ x(k-1) \\ x(k) \end{pmatrix} = \begin{pmatrix} 010 \\ 001 \\ 000 \end{pmatrix} \begin{pmatrix} x(k-3) \\ x(k-2) \\ x(k-1) \end{pmatrix} + \begin{pmatrix} 0 \\ 0 \\ 1 \end{pmatrix} u(k) \quad (7)$$

Further, if the air-fuel ratio at the confluence point is defined as y(k), the output equation can be written as $$y(k) = [c_1 \ c_2 \ c_3] \begin{pmatrix} x(k-3) \\ x(k-2) \\ x(k-1) \end{pmatrix} + c_4 u(k) \quad (8)$$

Here:

$c_1$:0.25379, $c_2$:0.10121, $c_3$:0.46111, $c_4$:0.18389

Since u(k) in this equation cannot be observed, even if an observer is designed from the equation, it will still not be possible to observe x(k). Thus, if one defines x(k+1)=x(k−3) on the assumption of a stable operating state in which there is no abrupt change in the air-fuel ratio from that 4 TDC earlier (i.e., from that of the same cylinder), Equation 9 is obtained.

$$\begin{pmatrix} x(k-2) \\ x(k-1) \\ x(k) \\ x(k+1) \end{pmatrix} = \begin{pmatrix} 0100 \\ 0010 \\ 0001 \\ 1000 \end{pmatrix} \begin{pmatrix} x(k-3) \\ x(k-2) \\ x(k-1) \\ x(k) \end{pmatrix}$$

$$y(k) = [c_1 \ c_2 \ c_3 \ c_4] \begin{pmatrix} x(k-3) \\ x(k-2) \\ x(k-1) \\ x(k) \end{pmatrix} \quad (9)$$

Figure 8:
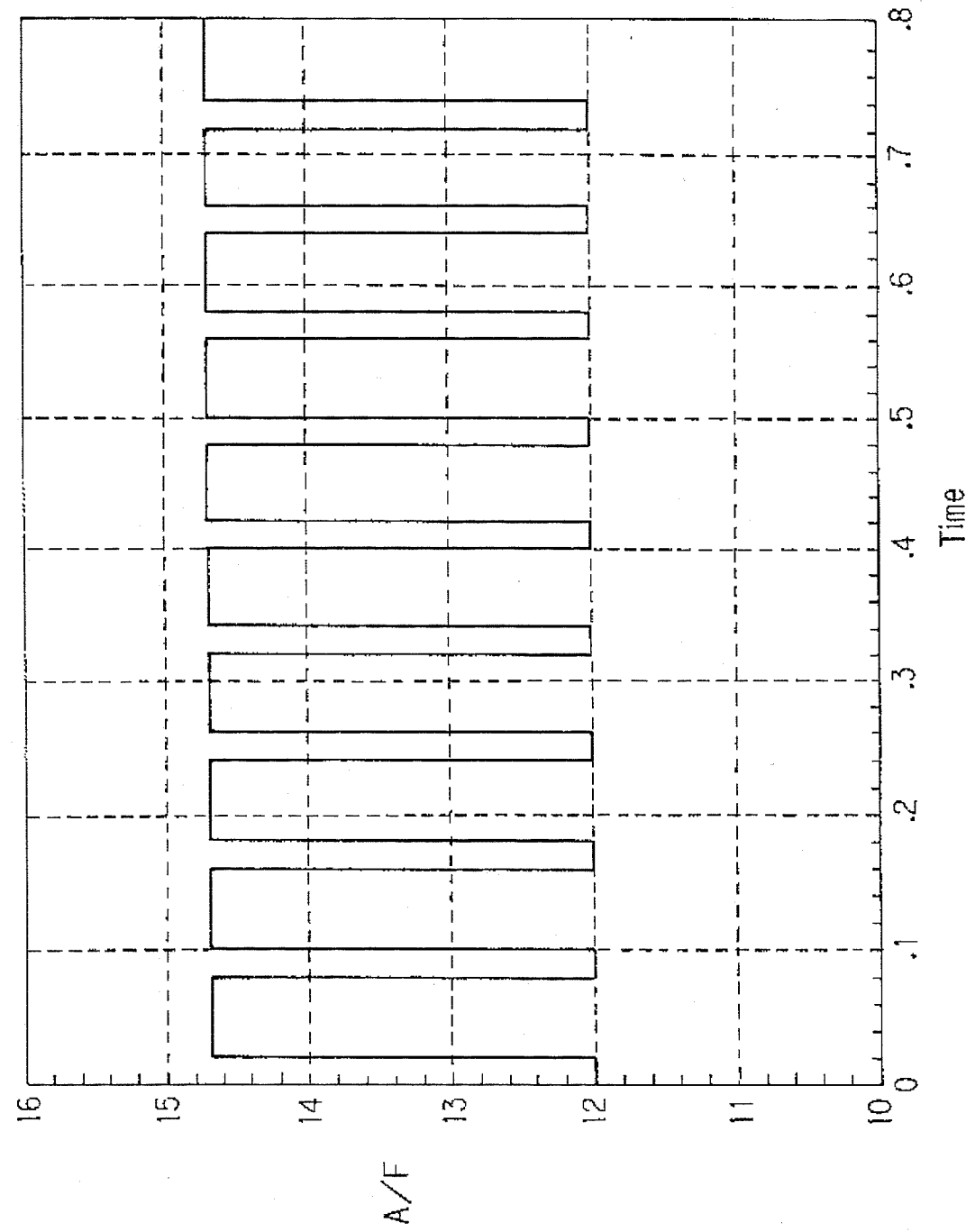
FIG. 8 is an explanatory view of simulation such that fuel is assumed to be supplied to three cylinders of a four-cylinder engine so as to obtain an air-fuel ratio of 14.7:1 and to one cylinder so as to obtain an air-fuel ratio of 12.0:1.
Figure 9:
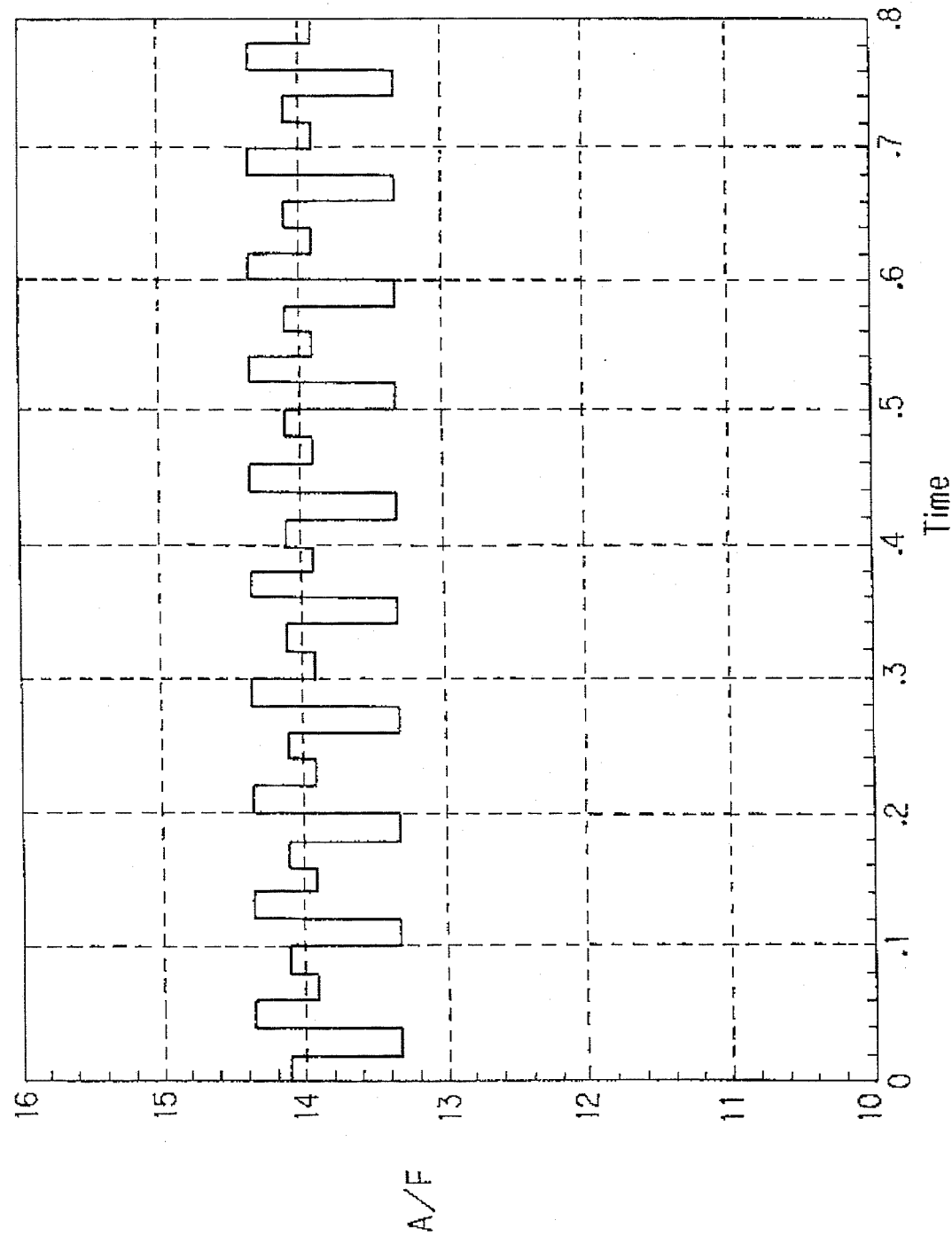
FIG. 9 is the result of the simulation showing the output of the exhaust system model indicative of the air-fuel ratio at a confluence point when the fuel is supplied in the manner illustrated in FIG. 8.
Figure 10:
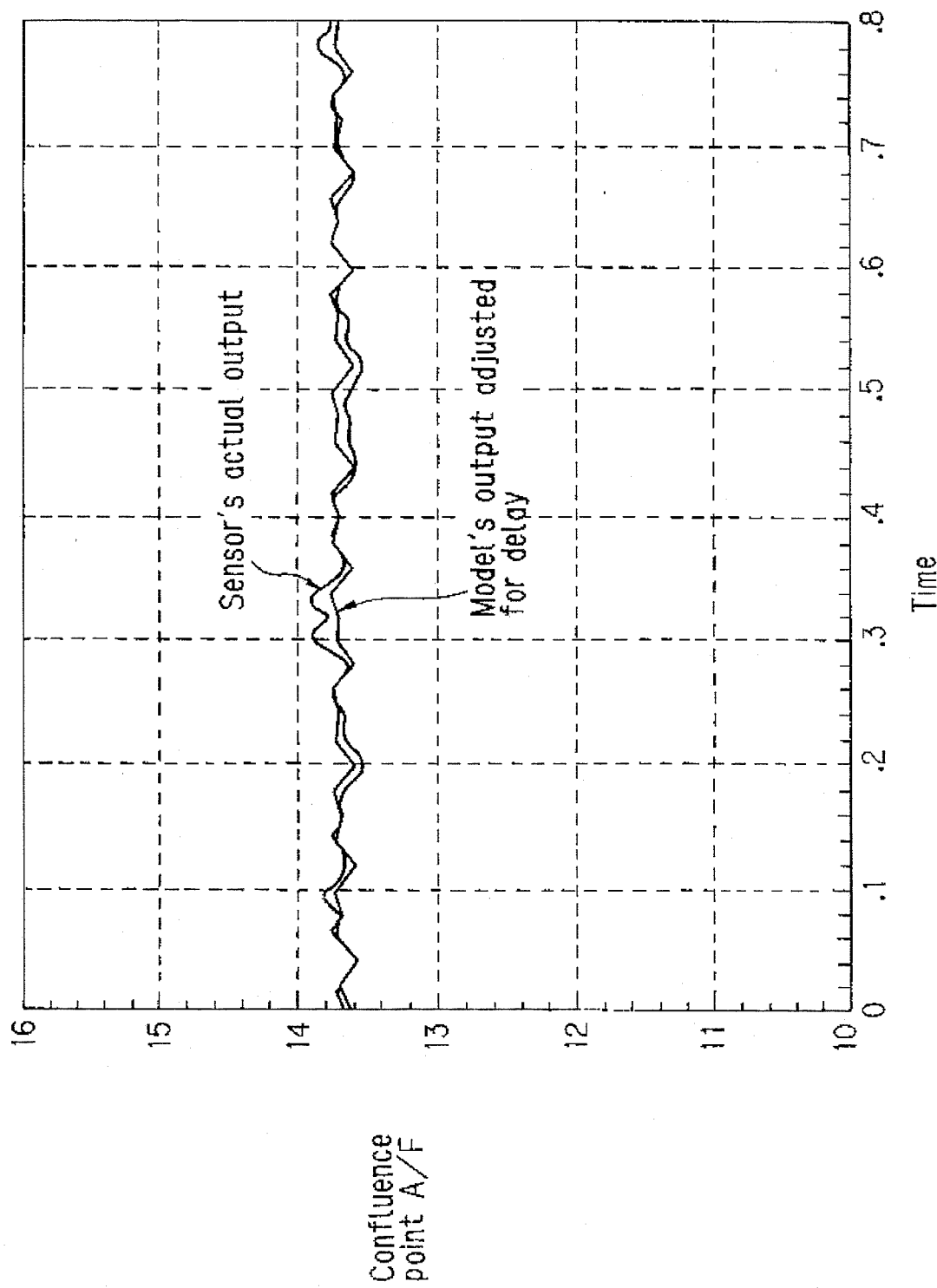
FIG. 10 is the result of the simulation showing the output of the exhaust system model adjusted for sensor detection response delay (time lag) in contrast with the sensor's actual output.

The simulation results for the model obtained in the foregoing manner will now be given. FIG. 8 relates to the case where fuel is supplied to three cylinders of a four-cylinder internal combustion engine so as to obtain an air-fuel ratio of 14.7:1 and to one cylinder so as to obtain an air-fuel ratio of 12.0:1. FIG. 9 shows the air-fuel ratio at this time at the confluence point as obtained using the aforesaid model. While FIG. 9 shows that a stepped output is obtained, when the response delay (lag time) of the LAF sensor is taken into account, the sensor output becomes the smoothed wave designated "Model's output adjusted for delay" in FIG. 10. The curve marked "Sensor's actual output" is based on the actually observed output of the LAF sensor under the same conditions. The close agreement of the model results with this verifies the validity of the model as a model of the exhaust system of a multiple cylinder internal combustion engine.

Thus, the problem comes down to one of an ordinary Kalman filter in which x(k) is observed in the state equation, Equation 10, and the output equation. When the weighted matrices Q, R are determined as in Equation 11 and the Riccati's equation is solved, the gain matrix K becomes as shown in Equation 12.

$$\begin{cases} X(k+1) = AX(k) + Bu(k) \\ y(k) = CX(k) + Du(k) \end{cases} \quad (10)$$

Here:

$$A = \begin{pmatrix} 0100 \\ 0010 \\ 0001 \\ 1000 \end{pmatrix} \quad C = [c_1 c_2 c_3 c_4] \ B = D = [0]$$

$$X(k) = \begin{pmatrix} x(k-3) \\ x(k-2) \\ x(k-1) \\ x(k) \end{pmatrix}$$

$$Q = \begin{pmatrix} 1000 \\ 0100 \\ 0010 \\ 0001 \end{pmatrix} \quad R = [1] \quad (11)$$

$$K = \begin{pmatrix} -0.3093 \\ 1.1918 \\ 0.3093 \\ 0.0803 \end{pmatrix} \quad (12)$$

Obtaining A−KC from this gives Equation 13.

$$A - KC = \begin{pmatrix} 0.0785 & 1.0313 & 0.1426 & 0.0569 \\ -0.3025 & -0.1206 & 0.4505 & -0.2192 \\ -0.0785 & -0.0313 & -0.1426 & 0.9431 \\ 0.9796 & -0.0081 & -0.0370 & -0.0148 \end{pmatrix} \quad (13)$$

Figure 11:
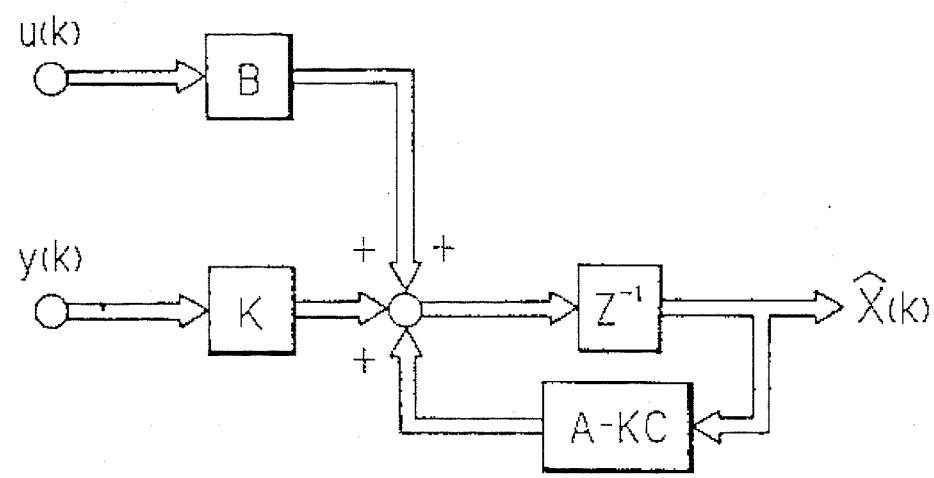
FIG. 11 is a block diagram showing the configuration of an ordinary observer.
Figure 12:
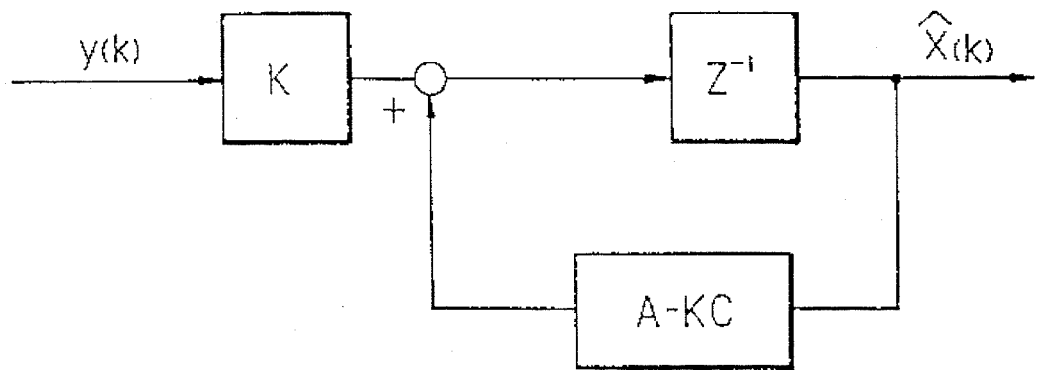
FIG. 12 is a block diagram showing the configuration of the observer referred to in the assignee's earlier application.

FIG. 11 shows the configuration of an ordinary observer. Since there is no input u(k) in the present model, however, the configuration has only y(k) as an input, as shown in FIG. 12. This is expressed mathematically by Equation 14.

$$\begin{cases} \hat{X}(k+1) = [A - KC]\hat{X}(k) + Ky(k) \\ \hat{x}(k) = [0001] \begin{pmatrix} \hat{x}(k-3) \\ \hat{x}(k-2) \\ \hat{x}(k-1) \\ \hat{x}(k) \end{pmatrix} \end{cases} \quad (14)$$

The system matrix of the observer whose input is y(k), namely of the Kalman filter, is $$S = \begin{pmatrix} A - KC & K \\ \hline 0001 & 0 \end{pmatrix} \quad (15)$$

In the present model, when the ratio of the member of the weighted distribution R in Riccati's equation to the member of Q is 1:1, the system matrix S of the Kalman filter is given as $$S = \begin{pmatrix} 0.0785 & 1.0313 & 0.1426 & 0.0569 & -0.3093 \\ -0.3025 & -0.1206 & 0.4505 & -0.2192 & 1.1918 \\ -0.0785 & -0.0313 & -0.1426 & 0.9431 & 0.3093 \\ 0.9796 & -0.0081 & -0.0370 & -0.0148 & 0.0803 \\ 0.0 & 0.0 & 0.0 & 1.0 & 0.0 \end{pmatrix} \quad (16)$$

Figure 13:
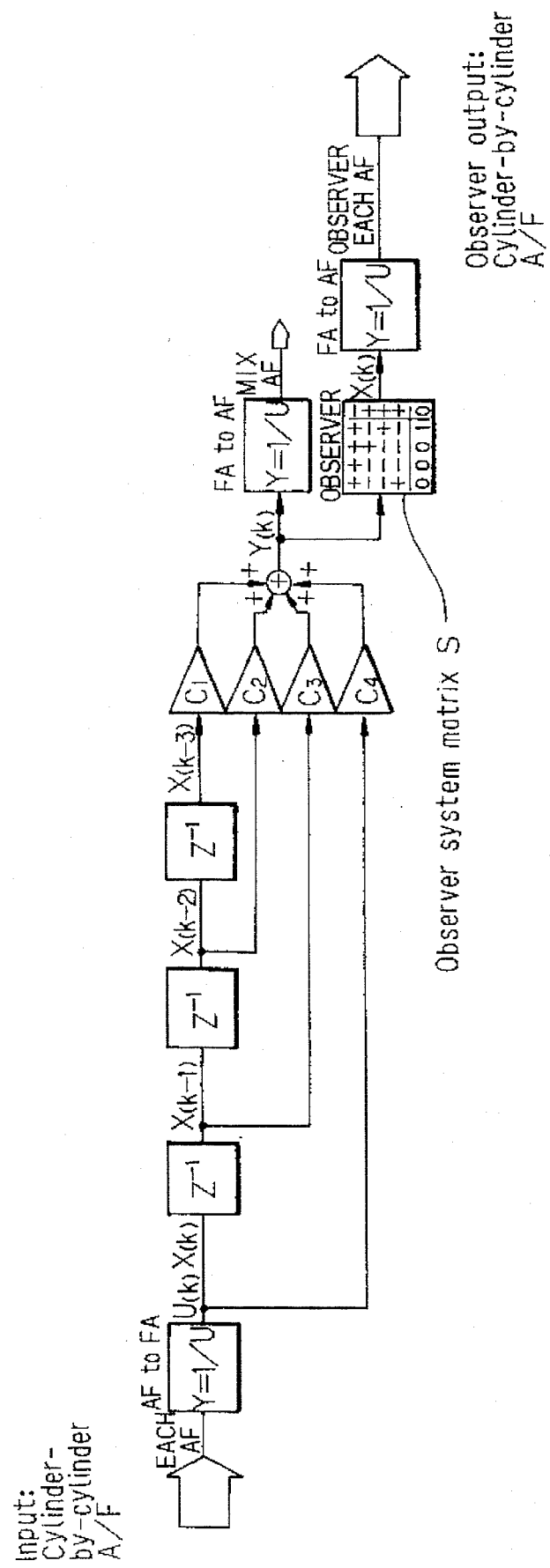
FIG. 13 is an explanatory block diagram showing the configuration combining the model of FIG. 7 and the observer of FIG. 12.

FIG. 13 shows the configuration in which the aforesaid model and observer are combined. As this was described in detail in the assignee's earlier application, further explanation is omitted here.

Figure 14:
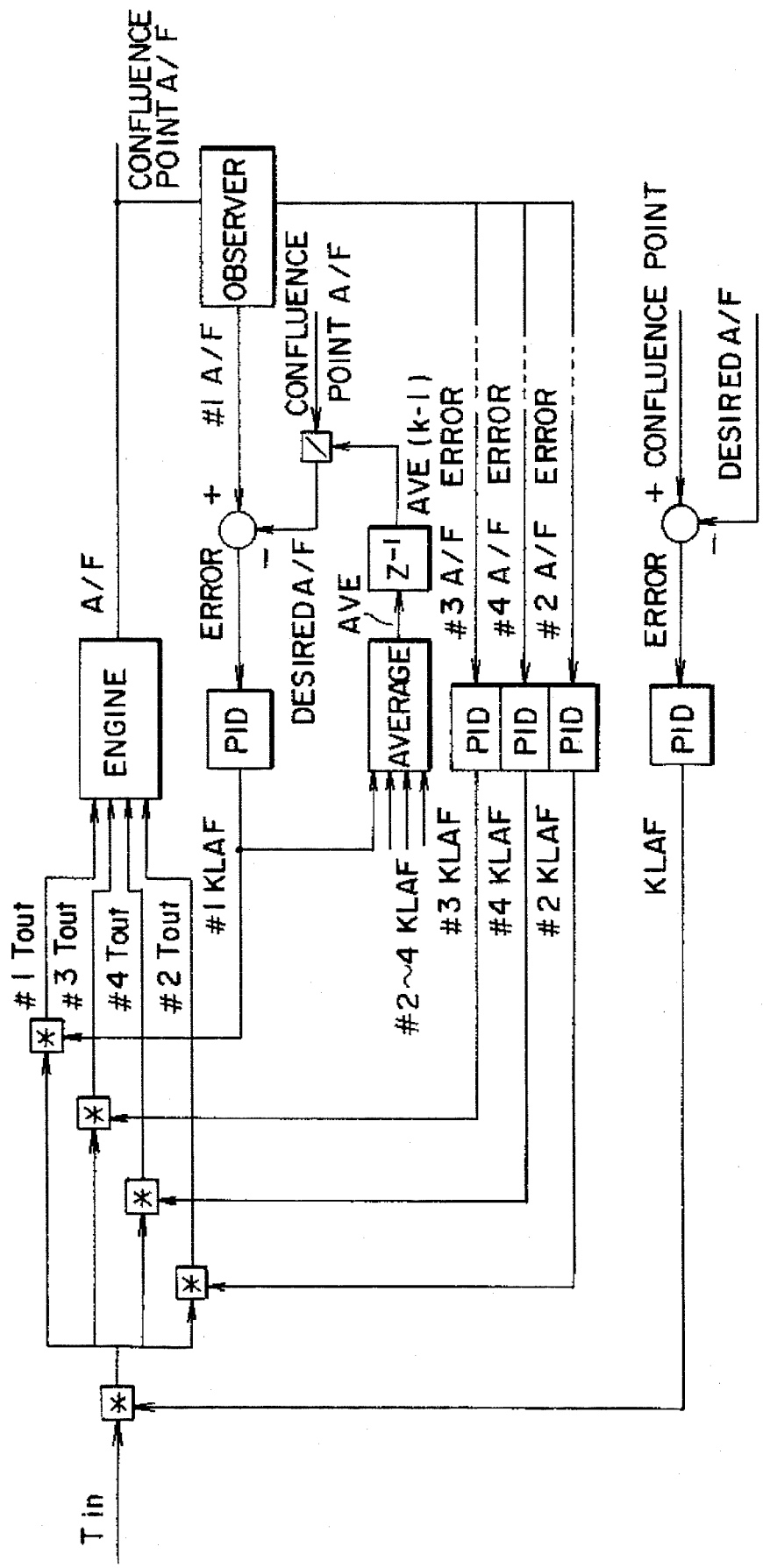
FIG. 14 is a block diagram showing an air-fuel ratio feedback control in which the air-fuel ratio is controlled to a desired ratio.

Since the observer is able to estimate the cylinder-by-cylinder air-fuel ratio (each cylinder's air-fuel ratio) from the air-fuel ratio at the confluence point, the air-fuel ratios of the individual cylinders can separately be controlled by a PID controller or the like. More specifically, as illustrated in FIG. 14, a first feedback gain KLAF is determined through the PID controller from the sensor output (configuration point air-fuel ratio) and a desired air-fuel ratio for a confluence point air-fuel ratio feedback control. At the same time, a second feedback gain #nKLAF (n: cylinder concerned) is determined through the PID controller from the air-fuel ratio #nA/F at the cylinder concerned estimated by the observer and a second desired air-fuel ratio. This second desired air-fuel ratio is obtained by dividing the aforesaid confluence point air-fuel ratio by an average of the second feedback gain #nKLAF, more precisely the average at the preceding control cycle of all cylinders. The second feedback gain #nKLAF is thus determined such that it operates to decrease an error between the second desired air-fuel ratio and the estimated air-fuel ratio #nA/F at the cylinder concerned.

With the arrangement, the air-fuel ratios at the individual cylinders converge on the confluence point air-fuel ratio and the confluence point air-fuel ratio converges, in turn, on the first desired air-fuel ratio. Thus, the air-fuel ratios of all cylinders can therefore be converged on the first desired air-fuel ratio.

Here, an output fuel injection quantity #nTout for a certain cylinder (n: cylinder concerned), defined in terms of the injector's opening period, is calculated as $$\#nTout = Tim \times KCMD \times KTOTAl \times \#nKLAF \times KLAF$$

where Tim: basic quantity; KCMD: first desired air-fuel ratio; KTOTAL: other correction terms. Additive correction terms such as battery voltage drop correction are omitted form explanation. And, since the details of this kind of control is described in Japanese Patent Application Hei 5-251,138 proposed by the assignee, further explanation is omitted.

Based on the foregoing, the operation of the system according to the invention will now be explained with reference to the flowchart of FIG. 3. The flowchart shows the operation of the main CPU 52 and is activated at each TDC crank position.

The program begins at step S10 in which the engine speed Ne and manifold absolute pressure Pb are read, and proceeds to step S12 in which a timing map is retrieved using the engine speed Ne and the manifold absolute pressure Pb as address data to select one among 12 buffers by its number (No. 1 to 11) and eventually to select one sampled datum stored at the buffer.

Figure 15:
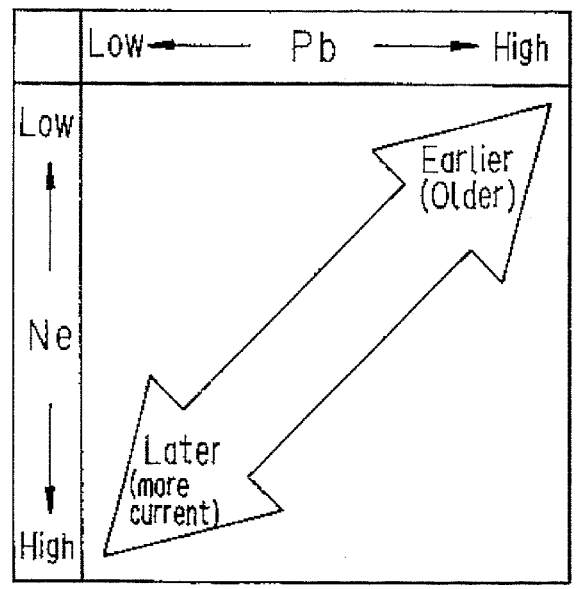
FIG. 15 is an explanatory view Showing the characteristics of a timing map referred to in the flowchart of FIG. 3.

FIG. 15 shows the characteristics of the timing map. As illustrated, it is arranged such that the datum sampled at earlier crank angular position is selected as the engine speed decreases or as the manifold absolute pressure (engine load) increases. Here, "the datum sampled at earlier crank angular position" means the datum sampled at a crank angular position closer to the last TDC crank position. Conversely speaking, the timing map is arranged such that, as the engine speed Ne increases or the manifold absolute pressure decreases, the datum sampled at a later crank angular position, i.e., at a later crank angular position closer to the current TDC crank position, namely more current sampled datum should be selected at that instance.

Figure 16:
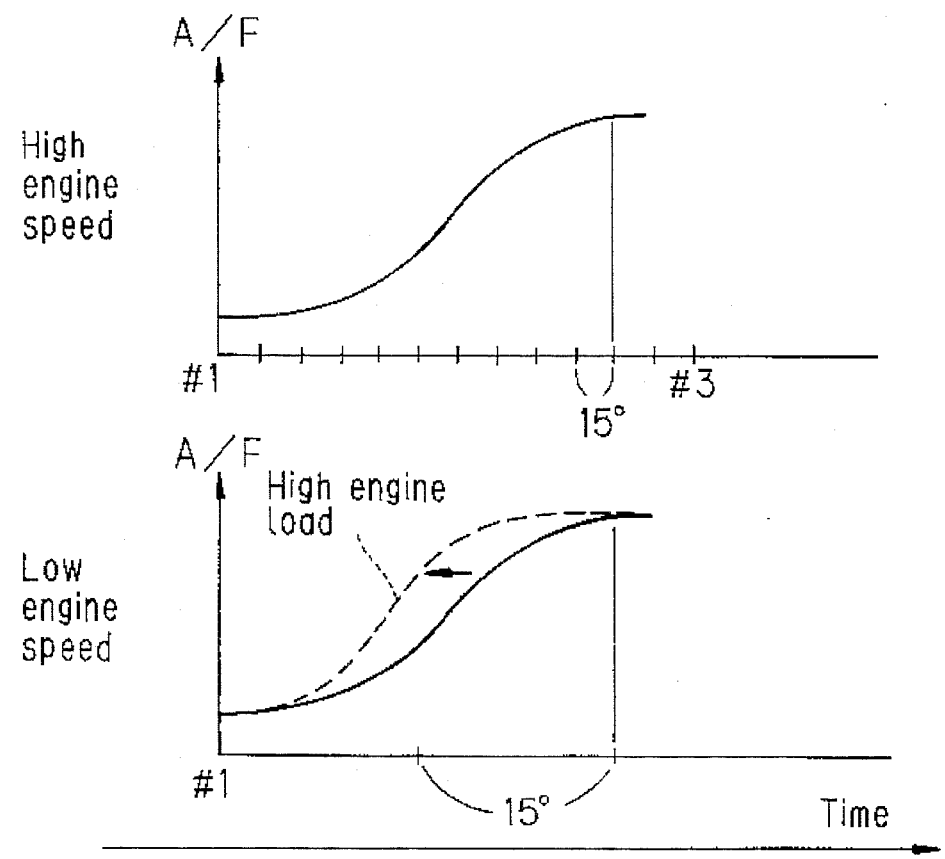
FIG. 16 is a timing chart showing the characteristics of sensor output with respect to the engine speed and load.
Figure 37:
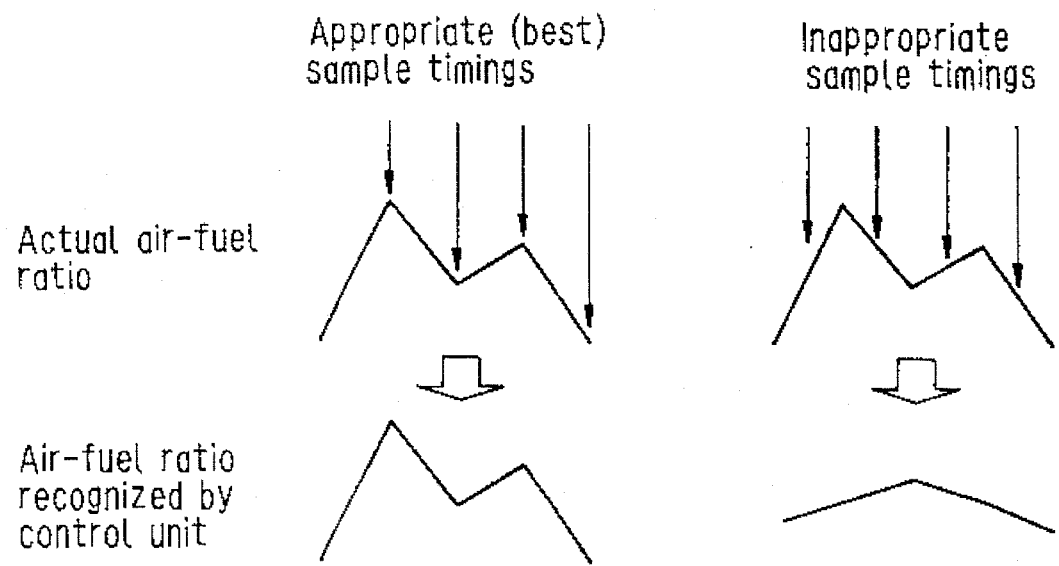
FIG. 37 is an explanatory view showing appropriate (best) sample timings of air-fuel ratio sensor outputs in contrast with inappropriate sample timings.

That is, it is the best way to sample the LAF sensor outputs at a position closest to the turning point of the actual air-fuel ratio as mentioned before with reference to FIG. 37. The turning point such as the first peak occurs at an earlier crank angular position as the engine speed lowers, as illustrated in FIG. 16, provided that the sensor's reaction time is constant. Moreover, it is considered that the pressure and volume of the exhaust gas increases as the engine load increases, and therefore the exhaust gas flow rate increases and hence the arrival time to the sensor becomes shorter. Based on the foregoing, the characteristics of the sample timing are set as illustrated in FIG. 15.

Returning to FIG. 3, the program proceeds to step S14 in which the main CPU 52 communicates with the I/O CPU 50 to indicate the selected buffer number, to step S16 to receive the datum stored at that buffer number.

Figure 17:
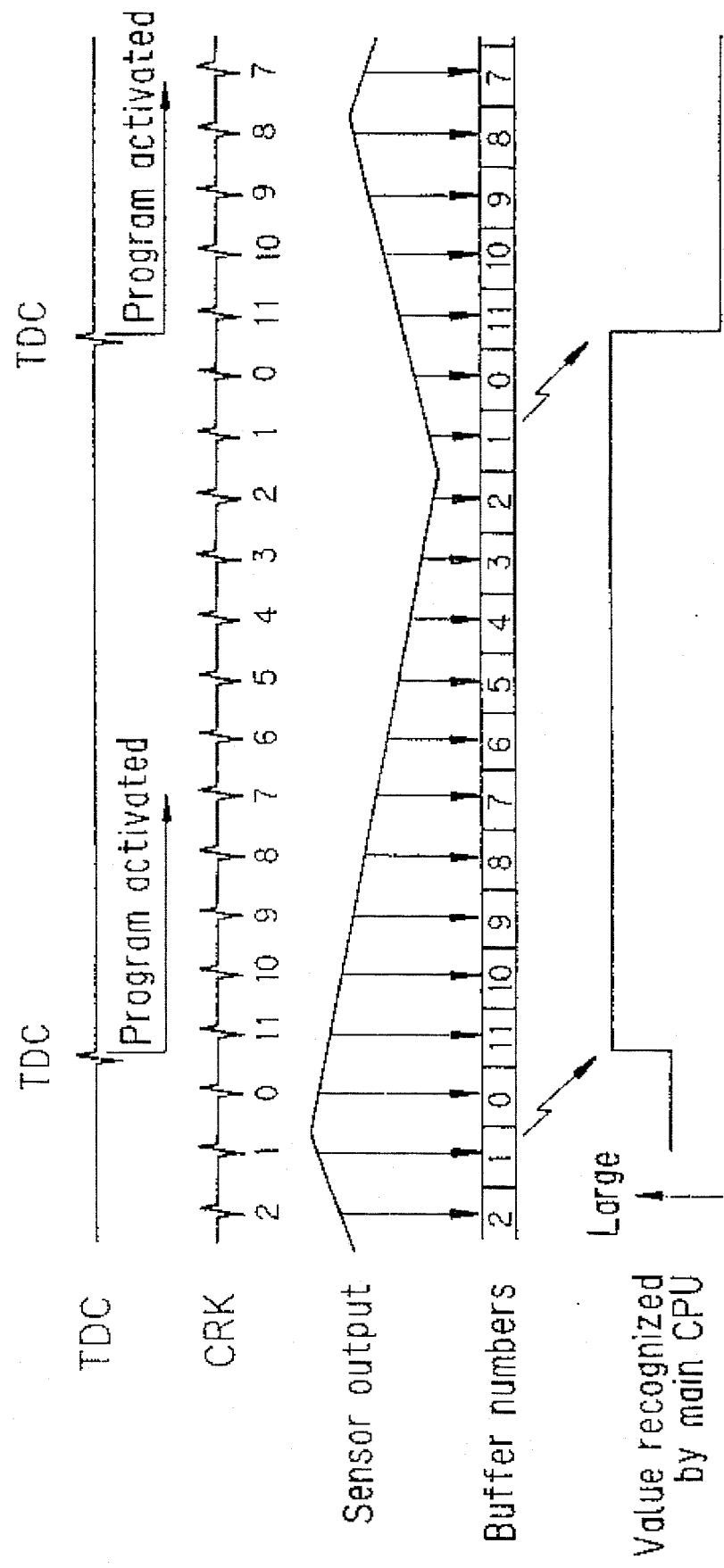
FIG. 17 is a timing chart showing the operation of the flowchart of FIG. 3.

With the arrangement, it becomes possible to enhance the air-fuel ratio detection accuracy. More specifically, as illustrated in FIG. 17, since the sampling is conducted at a relatively short interval, the sampled values can reflect the initial sensor output faithfully. Moreover, since the data sampled at every relatively short interval are successively stored in the buffers and by anticipating a possible turning point of the sensor output by the engine speed and manifold absolute pressure (engine load), one among those stored in the buffers presumably corresponding to that occurring at the turning point is selected. After this, the observer calculates the air-fuel ratios at the individual cylinders and the feedback control described with reference to FIG. 14 will be conducted.

As a result, the main CPU 52 is able to recognize the maximum and minimum values in the sensor output correctly as illustrated at the bottom of FIG. 17. It would be possible to change the sample timings themselves in response to the operating conditions of the engine. However, although the sample timings are fixed in the invention, it can be said that the invention is equivalent as changing the sample timings themselves in response to the operating conditions of the engine. In other words, the invention has the same advantages obtained in the aforesaid prior art system (Japanese Laid-open Patent Publication Hei 1-313, 644). Further, the invention can solve the disadvantage of the prior art system that the turning point has already expired, i.e, the turning point was behind when the detection point is detected. Further, the invention is advantageously simpler in configuration.

With the arrangement, when estimating the air-fuel ratios at the individual cylinders through the observer, it becomes possible to use the air-fuel ratio datum which approximates the actual behavior of the air-fuel ratio, enhancing the accuracy in observer estimation and hence improving the accuracy in feedback control illustrated in FIG. 14.

Figure 18:
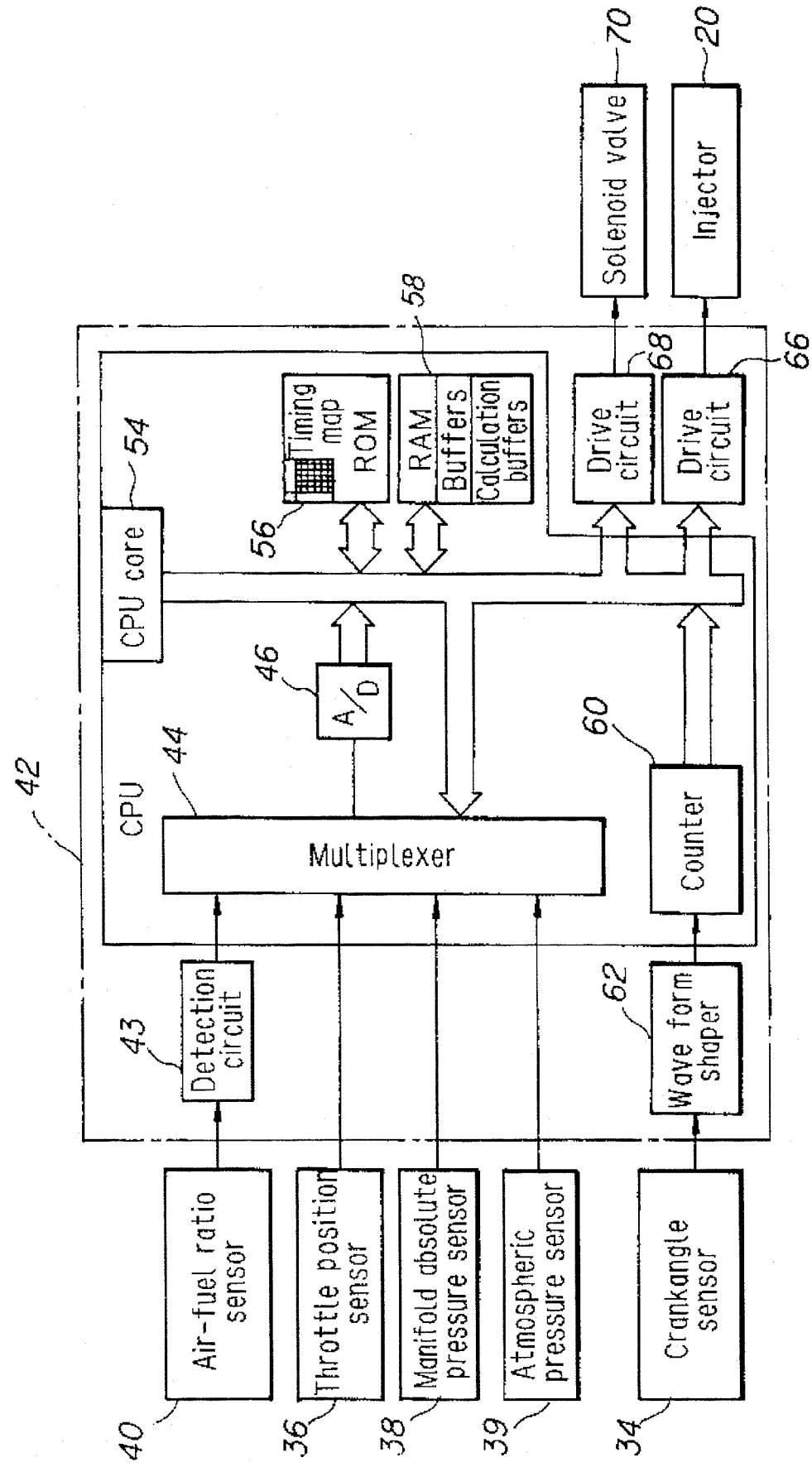
FIG. 18 is a block diagram of a control unit, similar to FIG. 2, but showing a second embodiment of the invention.

FIG. 18 is a block diagram of the control unit similar to FIG. 2, but shows a second embodiment of the invention.

In the second embodiment, the number of CPUs is decreased to one. The output of the LAF sensor 40 is received by a detection circuit 43 of the control unit 42 and the output of the detection circuit 43 is sent in a CPU and is input through a multiplexer 44 to an A/D (analog/digital) converter 46. Similarly, the outputs of the throttle position sensor 36 etc. are input to the CPU through the multiplexer 44 to the A/D converter 46. The CPU comprises a CPU core 54, a ROM (read-only memory) 56, a RAM (random access memory) 58 and a counter 60. The output of the crankangle sensor 34 is shaped by a waveform shaper 62 and has its output value counted by a counter 60, the result of the count being input to the RAM 58 together with the A/D converted values. In accordance with commands stored in the ROM 56, the CPU core 54 uses the detected values to compute a manipulated variable, drives the injectors 20 of the respective cylinders via a drive circuit 66 for controlling fuel injection and drives a solenoid valve 70 via a second drive circuit 68 for controlling the amount of secondary air passing through the bypass 28 shown in FIG. 1. The ROM 56 has the timing map and the RAM 58 has the buffers. The A/D values LAF of the LAF sensor output are stored in the buffers in the RAM 58.

Figure 19:
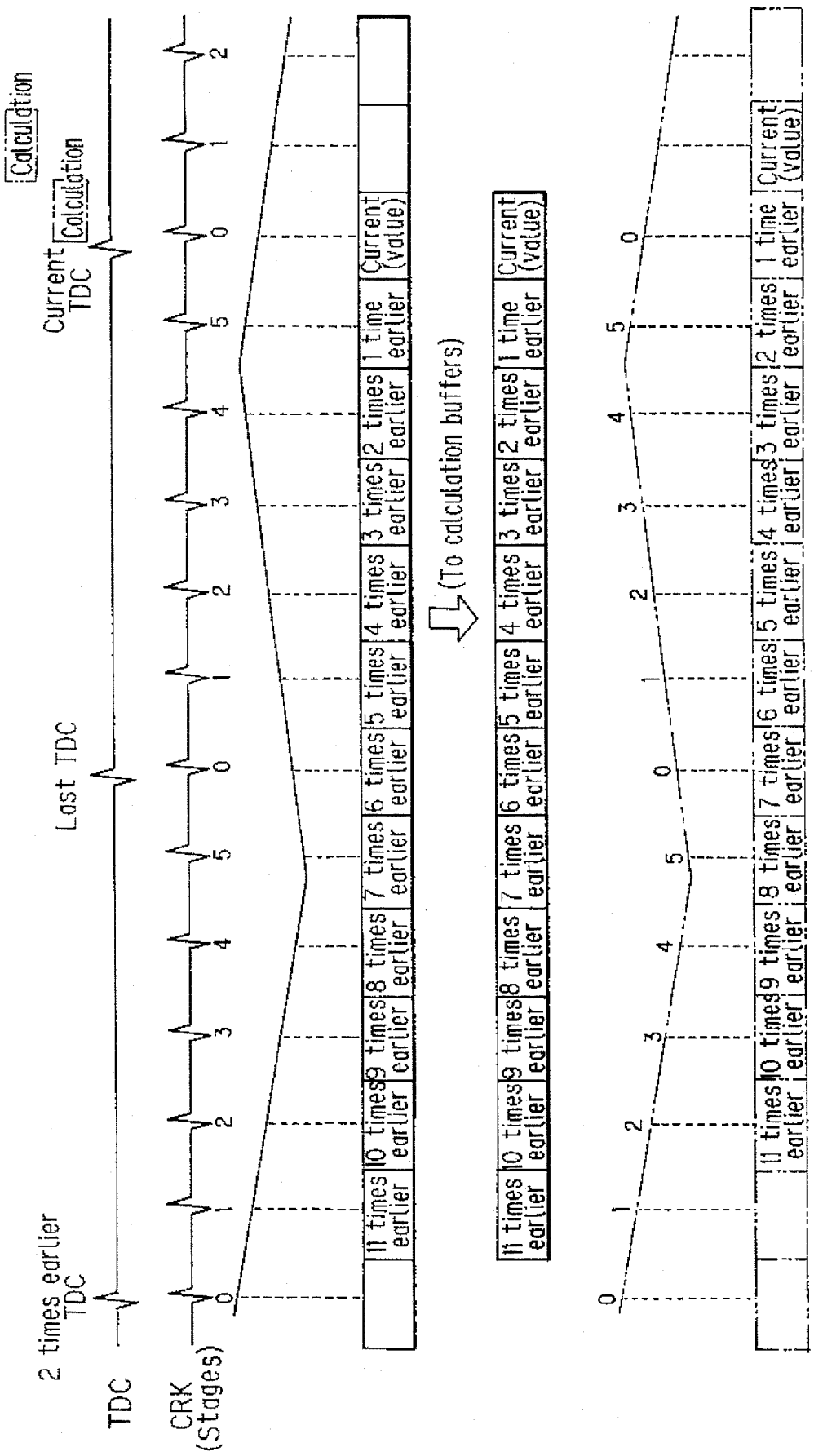
FIG. 19 is a timing chart showing the operation of the second embodiment of the invention.

Explaining the second embodiment with reference to the timing chart of FIG. 19, the TDC interval is divided into 6 stages. Aside from the number of stages, it may sometimes happen the necessity that the sensor outputs are sampled and stored over a plurality of TDC intervals. For that purpose, the second embodiment is arranged such that any data obtained in a range of crank angles starting at the stage such as that fallen just after the current TDC crank position and back to the 11 times (stages) earlier and one among them is selected at crank angular range named as "calculation" in the figure. Based on the selected datum, the air-fuel ratios at the individual cylinders are then estimated through the observer.

In the second embodiment, if the calculation (sampled datum selection) is delayed to the position illustrated by a phantom line in the figure due to the engine speed rise or so, since the sampling has successively been continuing for the period, the data stored in the buffers may be renewed as illustrated at the bottom of the figure by phantom lines. As a result, the data once recognized as that 8 times earlier, i.e., stage 4 at the TDC interval 2 times earlier, may shifted to stage 5 at the same TDC interval, for example. The second embodiment aims to solve the problem.

Figure 20:
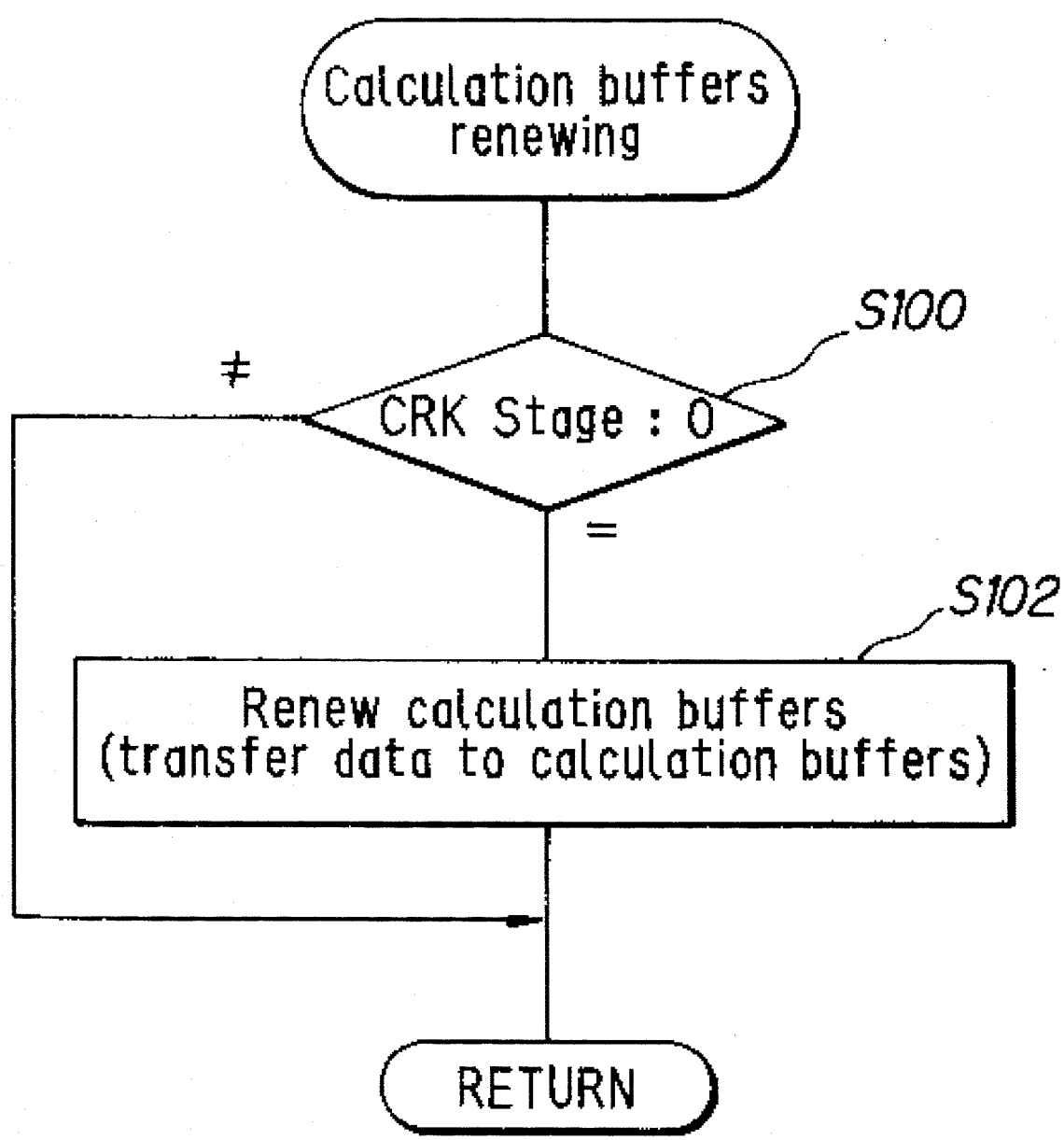
FIG. 20 is a flowchart showing the operation of the second embodiment of the invention.

For that purpose, the RAM 58 is provided with second buffers named "calculation buffers" as illustrated in FIG. 18 and the CPU core 54 moves the data once stored in the first buffers to the second (calculation) buffers at a predetermined timing at a stretch, as illustrated in FIG. 19. This will be explained with reference to the flowchart of FIG. 20. Specifically, it is checked in step S100 if the CRK signal is for stage 0, i.e., if the current stage is stage 0 in the calculation angular range and if it is, the program passes to step S102 in which the data over the two TDC intervals stored in the first buffers are transferred at a time to the second buffers.

With the arrangement, if the calculation is delayed as illustrated at the right top in FIG. 19, the sampled data once stored are kept as they are and prevent from being destroyed until the calculation (data selection) has been completed. As a result, the air-fuel ratio detection accuracy, the observer estimation accuracy and the cylinder-by-cylinder air-fuel ratio feedback control accuracy are enhanced without exception. The remainder of the second embodiment is the same as the first embodiment.

It should be noted that although the calculation buffers are used in the second embodiment, the embodiment is not limited to the disclosure and anything else that can store the data is usable.

It should also be noted that the second embodiment is based on the proviso that the calculation timing (data selection timing) is floating. Saying this in reverse, if the calculation is conducted at a fixed crank angular position, the first embodiment will suffice for the purpose. If the sampling be conducted over two TDC intervals or more in the first embodiment, the capacity of buffers 50*a* should accordingly be increased.

It should further be noted that it is alternatively possible to use in the first embodiment the configuration of the CPU used in the second embodiment.

Figure 21:
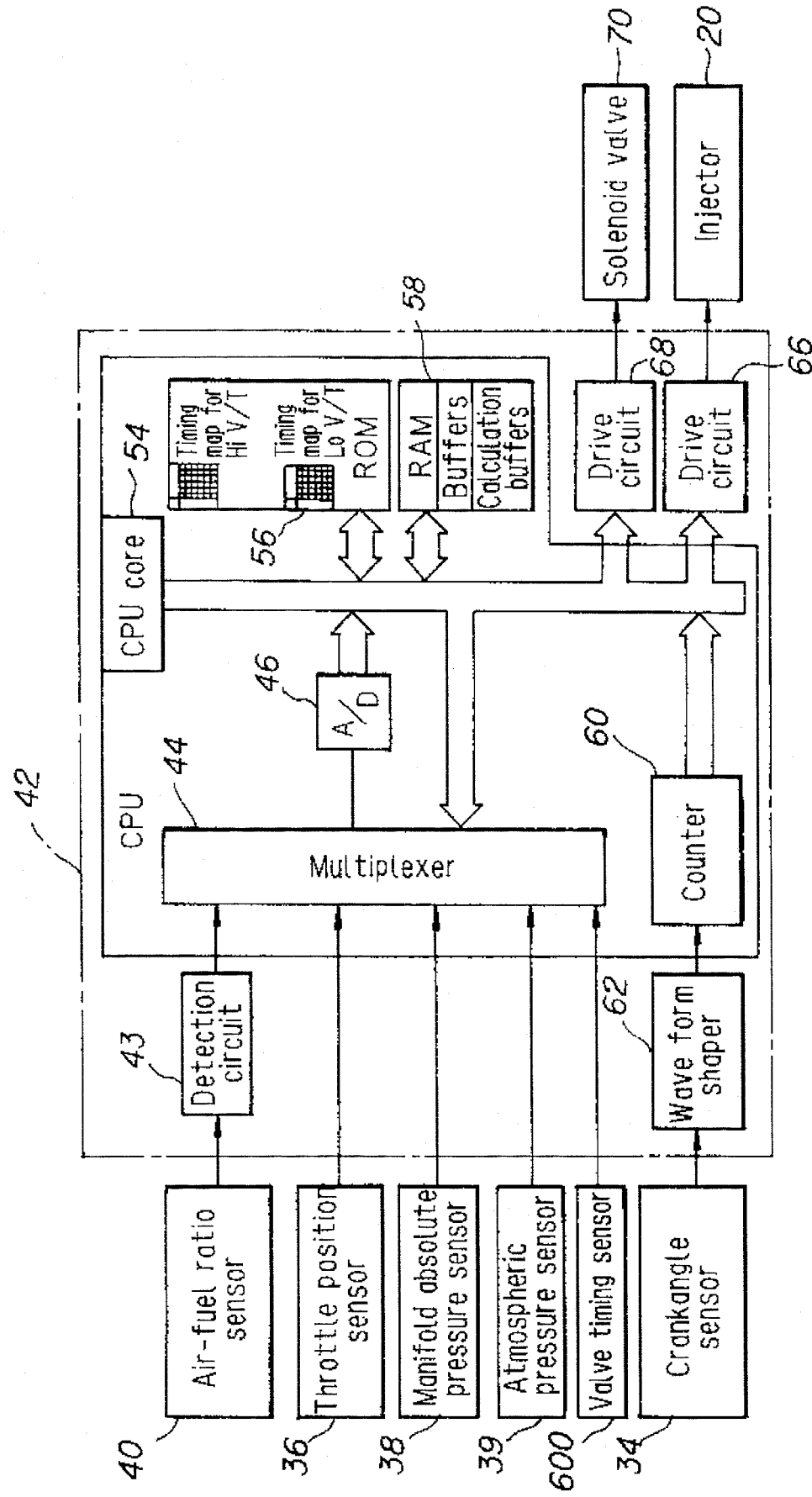
FIG. 21 is a block diagram of a control unit, similar to FIG. 18, but showing a third embodiment of the invention.

FIG. 21 is a block diagram similar to FIG. 18, but shows a third embodiment of the invention. The third embodiment relates to the air-fuel ratio detection in the engine equipped with the variable valve timing mechanism.

Figure 22:
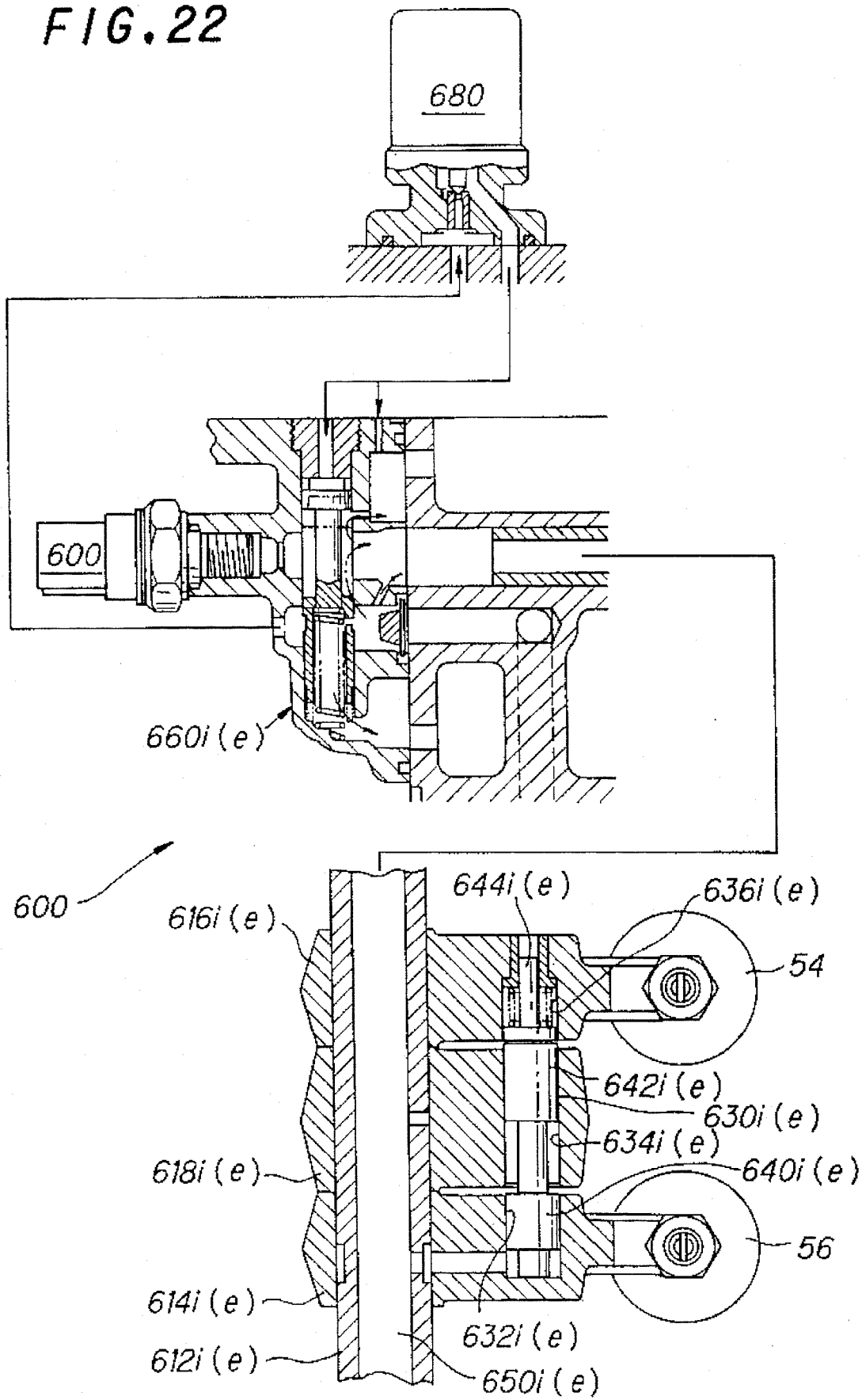
FIG. 22 is an explanatory view of a variable valve timing mechanism used in an internal combustion engine of the third embodiment of the invention.
Figure 23:
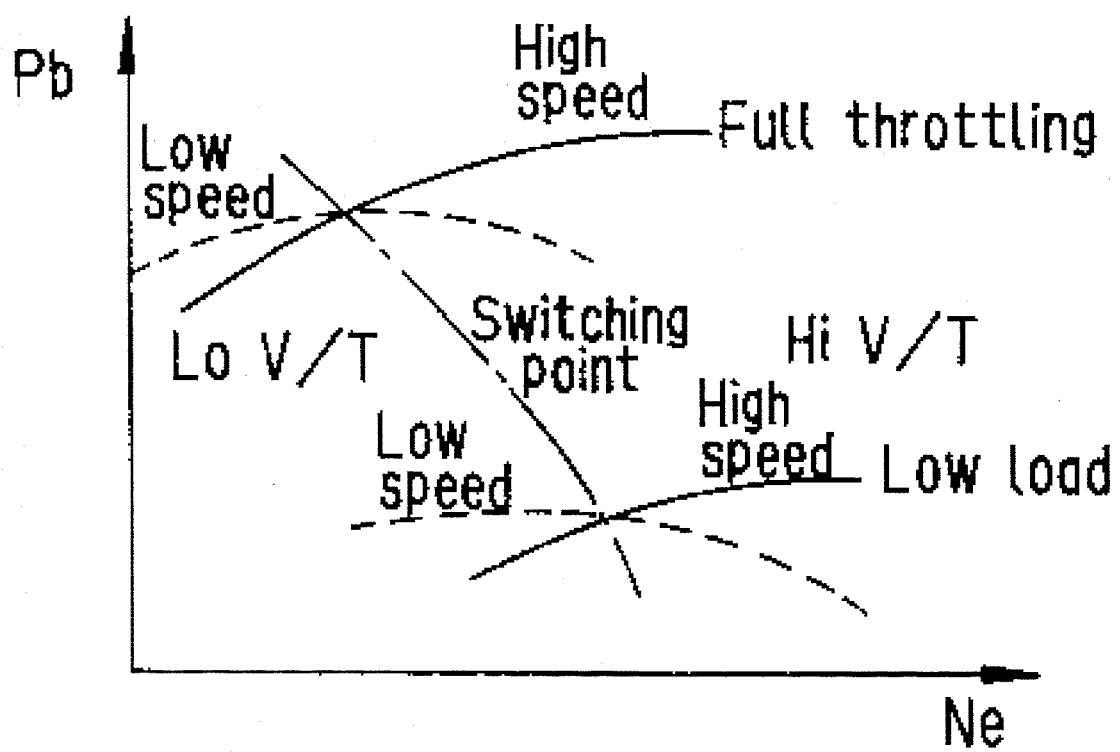
FIG. 23 is an explanatory view of the switching characteristics of the valve timing in the variable valve timing mechanism illustrated in FIG. 22.

Referring to FIGS. 22 and 23, the variable valve timing mechanism will briefly be explained.

In the illustrated example, the variable valve timing mechanism has three rocker arms 614, 616, 618 rotatably mounted on a rocker shaft 612 respectively provided in the vicinity of an intake valve 54 and an exhaust valve 56. (Since the configuration is the same as in the intake side and the exhaust side, numerals are provided with a suffix "i" or "e" and the explanation will be made without using the suffix.) The rocker arms are in contact with two cams for low speed (not shown) and one cam for high speed (not shown) whose profile projects outwardly than that of the low speed cams. The cams are mounted on a cam shaft (not shown). The rocker arms 614, 616, 618 have an engaging mechanism 630 comprising of an oil passage 650, a recess 632 and holes 634, 636 and pins 640, 642 and 644. A switching mechanism 660 is interposed between an oil power source (not shown) and the oil passage 650 and supplies/cuts oil to the passage through an electromagnetic valve 680 in order to move the pins forward or reward to engage/disengage the rocker arms. The valve timing and the amount of valve lifting are determined by the high speed cam when the rocker arms are engaged and are determined by the low speed cams when the rocker arms are disengaged. Since the structure and operation of the variable valve timing mechanism is known in the art, no further explanation is made.

The engagement/disengagement of the rocker arms is determined on the basis of the engine speed Ne and manifold absolute pressure Pb as illustrated in FIG. 23. When the high speed cam operates (this hereinafter referred to as "Hi V/T"), the valve timing is advanced than the case when the low speed cams operate (this hereinafter referred to as "Lo V/T") so that the amount of overlapping of valve timing and the amount of valve lifting are increased. The switching mechanism 660 has a valve timing sensor 600 made up of such as an oil pressure switch which detects through the oil pressure in the passage 650 whether the valve timing is controlled at Hi V/T or Lo V/T. The output of the valve timing sensor 600 is sent to the CPU, as illustrated in FIG. 21.

As mentioned before, it is considered that the air-fuel ratio detection will be influenced if the valve timing is switched. In the third embodiment, therefore, one among the sampled data is selected in response to the engine speed and manifold absolute pressure and in addition the valve timing (hereinafter referred to as "V/T").

This will be explained with reference to the flowchart of FIG. 24. The flowchart shows the operation of the CPU core 54 in FIG. 21.

Figure 25:
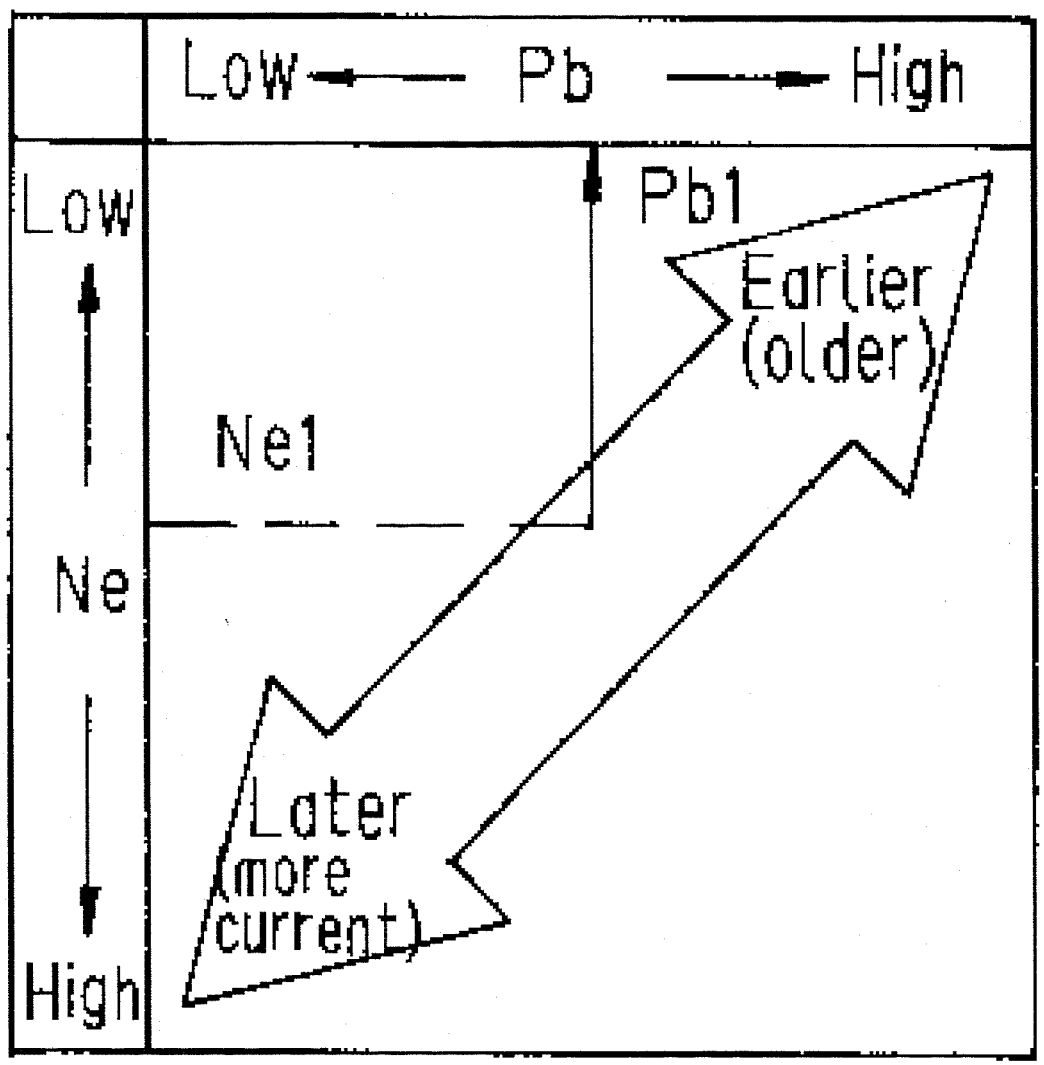
FIG. 25 is an explanatory view showing the characteristics of a timing map referred to in the flow chart of FIG. 24.

The program begins at step S200 in which the engine speed Ne, the manifold absolute pressure Pb and the valve timing V/T are read and proceeds to step S202 in which it is checked whether the valve timing is controlled at Hi V/T or Lo V/T and based on the result, to step S204 or S206 in which a timing map for the valve timing concerned is retrieved using the engine speed and manifold pressure as address data. FIG. 25 shows the characteristics of the timing maps. Assuming that a certain engine speed Ne1 is defined for the Lo V/T as "Ne1-Lo" and for the Hi V/T as "Ne1-Hi" and that a certain manifold pressure Pb is defined for the Lo V/T as "Pb1-Lo" and for the Hi V/T as "Pb1-Hi", the characteristics of the maps are as Ne1-Lo>Ne1-Hi Pb1-Lo>Pb1-Hi.

Specifically, since the exhaust valve at the Hi V/T is opened at a timing earlier than that at the Lo V/T, the map characteristics are set such that the datum sampled earlier is selected if the engine speed and manifold absolute pressure are constant.

Returning to FIG. 24, the program proceeds to step S208 in which the sampled datum selection is conducted in a manner similar to those mentioned in steps S12 to S16 in the flowchart of FIG. 3, to step S210 in which the observer matrix calculation shown in Eq. 14 is conducted for the Hi V/T based on the selected sampled datum, to step S212 in which similar calculation is conducted for the Lo V/T, to step S214 in which again the valve timing is checked and in response to the result, to step S216 or S218 in which either result of calculation conducted at S210 and S212 is selected.

Namely, since the behavior of the air-fuel ratio at the exhaust system confluence point varies due to the valve timing switching, it becomes necessary to change the observer matrices. However, the estimation of the air-fuel ratios at the individual cylinders does not finish in a moment, but it takes several control cycles until the each cylinder's air-fuel ratio estimation has converged. Therefore, the calculations using the observer matrices before and after the valve timing is switched are conducted at the same time, and if the valve timing is really switched, one of the two calculation results is selected in response to the checking result at step S214. Needless to say, after the air-fuel ratios at the individual cylinders are estimated, the feedback gains are determined and the fuel injection quantity is determined for the cylinder concerned as mentioned before.

With the arrangement, it become possible to select an optimum sampled sensor output datum in the air-fuel ratio detection in the engine in which the valve timing is intentionally varied, thereby enhancing detection accuracy. Moreover, when estimating the air-fuel ratios at the individual cylinders through the observer using the selected datum, it becomes possible to improve the estimation accuracy.

Figure 24:
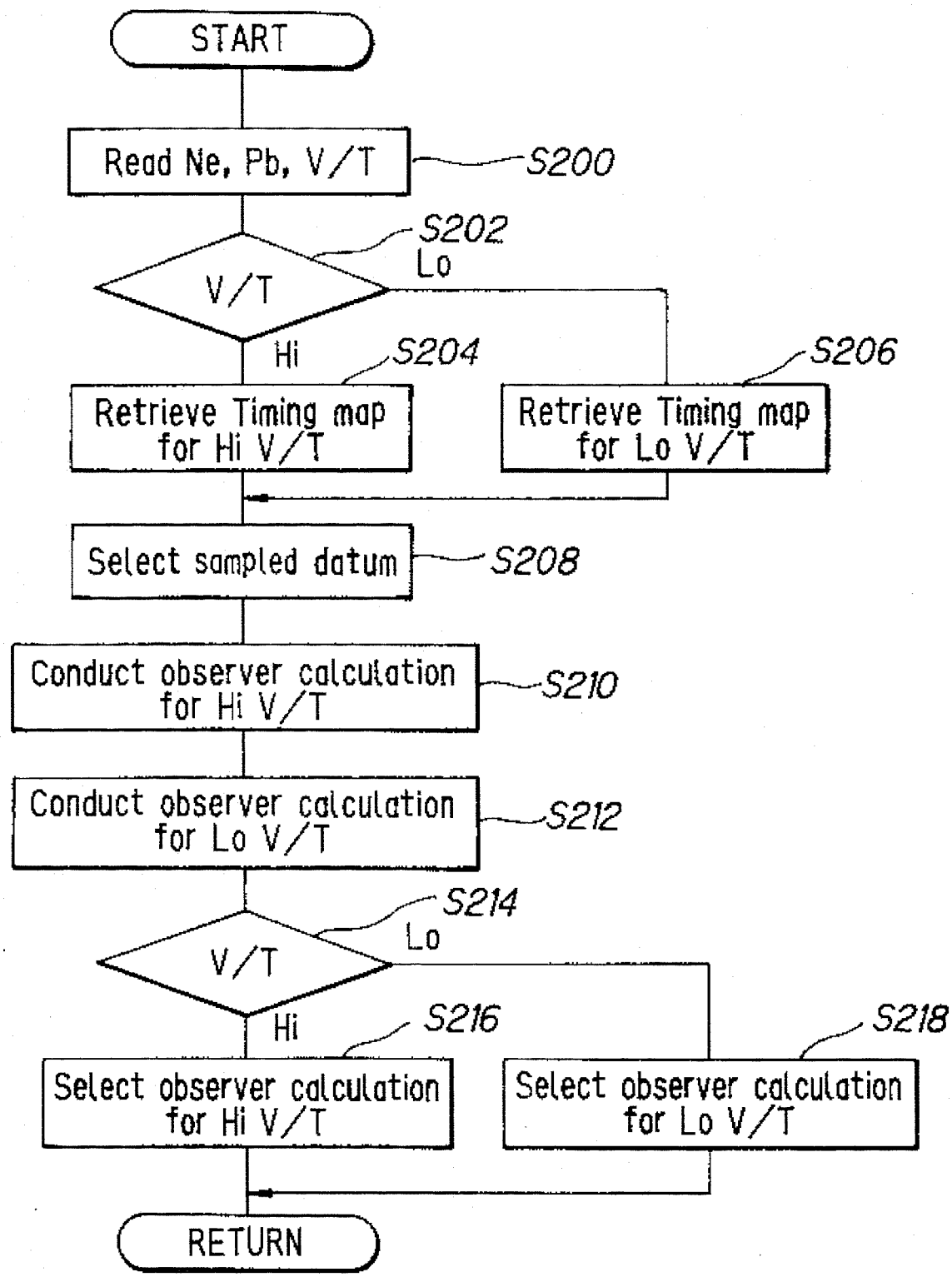
FIG. 24 is a flowchart showing the operation of the third embodiment of the invention.
Figure 26:
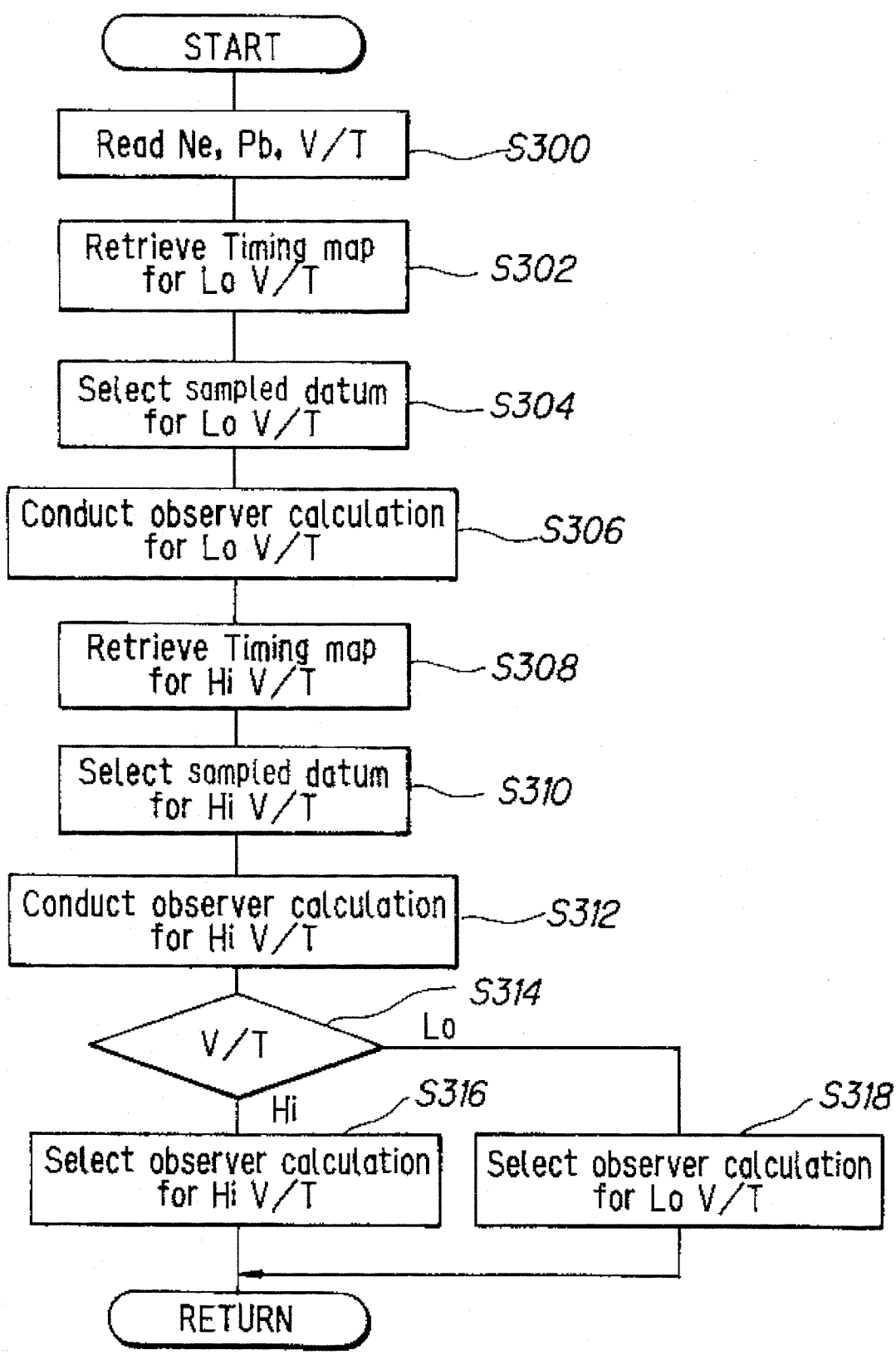
FIG. 26 is a flowchart, similar to FIG. 24, but showing a fourth embodiment of the invention.

FIG. 26 is a flowchart similar to FIG. 24, but shows a fourth embodiment of the invention.

In the flowchart, the program starts at step S300 in which the engine speed Ne or the like are read and proceeds to step S302 in which the timing map for the Lo V/T is retrieved, to step S304 in which one among the sampled data is selected for the Lo V/T, to step S306 in which the observer matrix calculation for the Lo V/T is conducted, to steps S308 to S312 in which similar procedures are taken for the Hi V/T, to step S314 in which the valve timing is checked and based on the result, to step S316 or S318 in which one of the calculation result is selected.

Namely, in the fourth embodiment, the selection of sampled datum is conducted irrespective of which valve timing is operable. The calculations are conducted for the two valve timings and the valve timing is for the first time determined at step S314. The remaining of the fourth embodiment as well as the advantages is the same as the third embodiment.

The third and fourth embodiments uses as a CPU the configuration illustrated in FIG. 18 and used in the second embodiment. It is alternatively possible to use the configuration of the first embodiment illustrated in FIG. 2.

It should further be noted, although the variable valve timing mechanism in which both the intake valve and the exhaust valve are both switched has been taken as an example of the mechanism in the third and fourth embodiments, the invention is not limited to that kind of the variable valve timing mechanism and is applicable to other kind of the mechanism including a type in which only either of the valves is switched and a type in which the operation of the intake valve can be stopped.

It should be noted that the oil pressure switch is taken as an example for detecting the valve timing, it is alternatively possible to achieve the same purpose by detecting the positions of the pins 640, 642, 644, or by referring a signal indicative of valve timing switching issued from a control unit of the valve switching mechanism.

Figure 27:
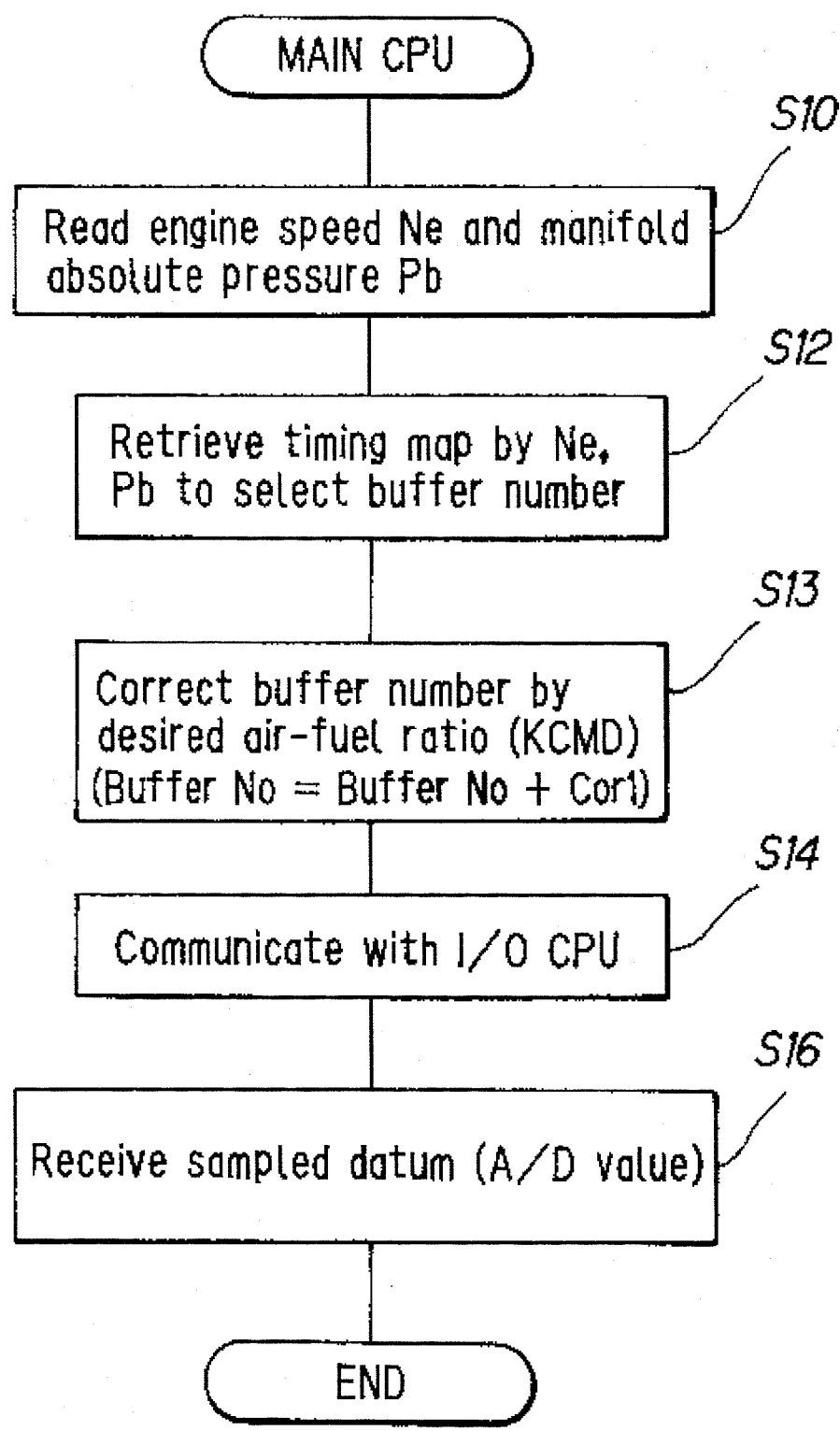
FIG. 27 is a flowchart, similar to FIG. 3, but showing a fifth embodiment of the invention.

FIG. 27 is a flowchart similar to FIG. 3, but shows a fifth embodiment of the invention.

As mentioned before, the air-fuel ratio varies with the reaction time of the LAF sensor 40. And when the air-fuel ratio is leaner than the stoichiometric value, the reaction time is shorter than the case when the air-fuel ratio is rich. This is because, in the LAF sensor 40, the pumping element acts to pump out oxygen ion from a chamber in a lean mixture, while pumping in the oxygen ion in the chamber in a rich mixture. Namely, the sensor responds to a lean mixture quicker than to a rich mixture. The fifth embodiment aims to the solve the problem.

Figure 28:
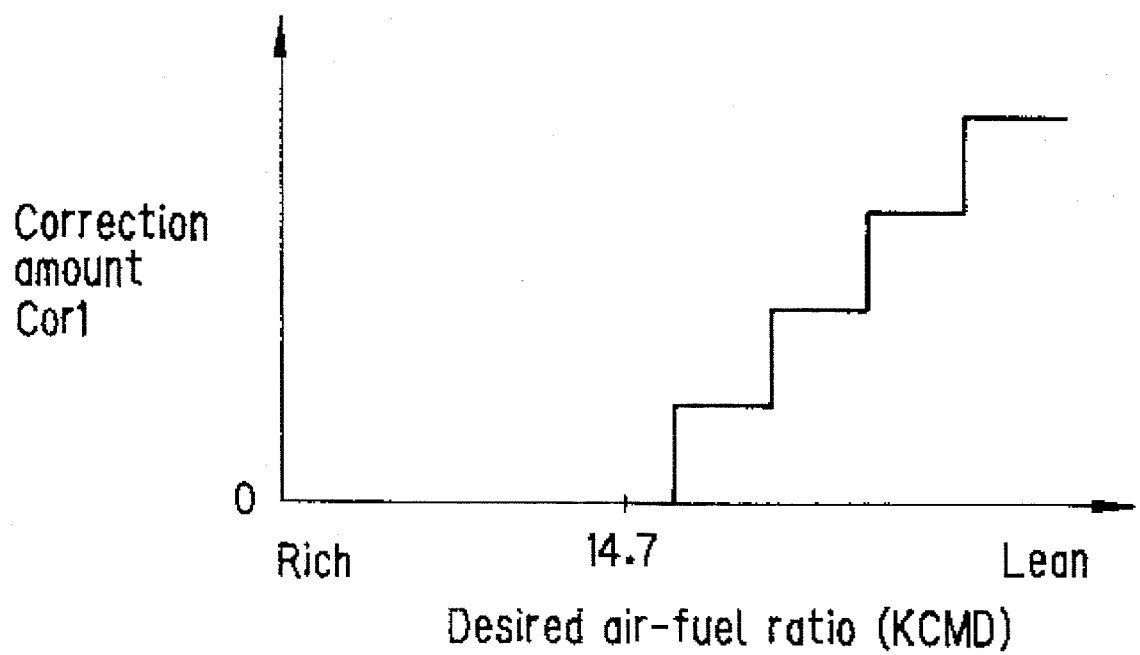
FIG. 28 is an explanatory view showing the characteristics of a correction amount referred to in the flowchart of FIG. 27.

Specifically, in the flowchart of FIG. 27, a step S13 is newly inserted in which the number of one among the buffers 50a selected in the last step is corrected in response to the desired air-fuel ratio (i.e. the first desired air-fuel ratio KCMD mentioned before). More precisely, if the desired air-fuel ratio is leaner than the stoichiometric air-fuel ratio, the number of buffer selected illustrated in FIG. 17 is added with a correction amount Cor1 (positive value). This means that a datum sampled at an earlier crank angular position is selected. FIG. 28 shows the characteristics of the correction amount Cor1, in which the correction amount Cor1 increases as the desired air-fuel ratio becomes leaner. As is apparent from the figure, when the desired air-fuel ratio is rich, on the other hand, the selected buffer number is left as it is. The rest is the same as the first embodiment.

With the arrangement, it becomes possible to detect the air-fuel ratio irrespective of the air-fuel ratio of the mixture more accurately and hence to improve the accuracy of the observer estimation conducted based on the selected datum and the accuracy of the feedback control conducted based on the estimated air-fuel ratios. The reason why the desired air-fuel ratio is used is that if the air-fuel ratio is controlled at the desired air-fuel ratio, the air-fuel ratio of the ambient air-fuel mixture about the LAF sensor 40 will be the desired value. Instead of the desired air-fuel ratio, therefore, it is alternatively possible to use the detected air-fuel ratio.

Figure 29:
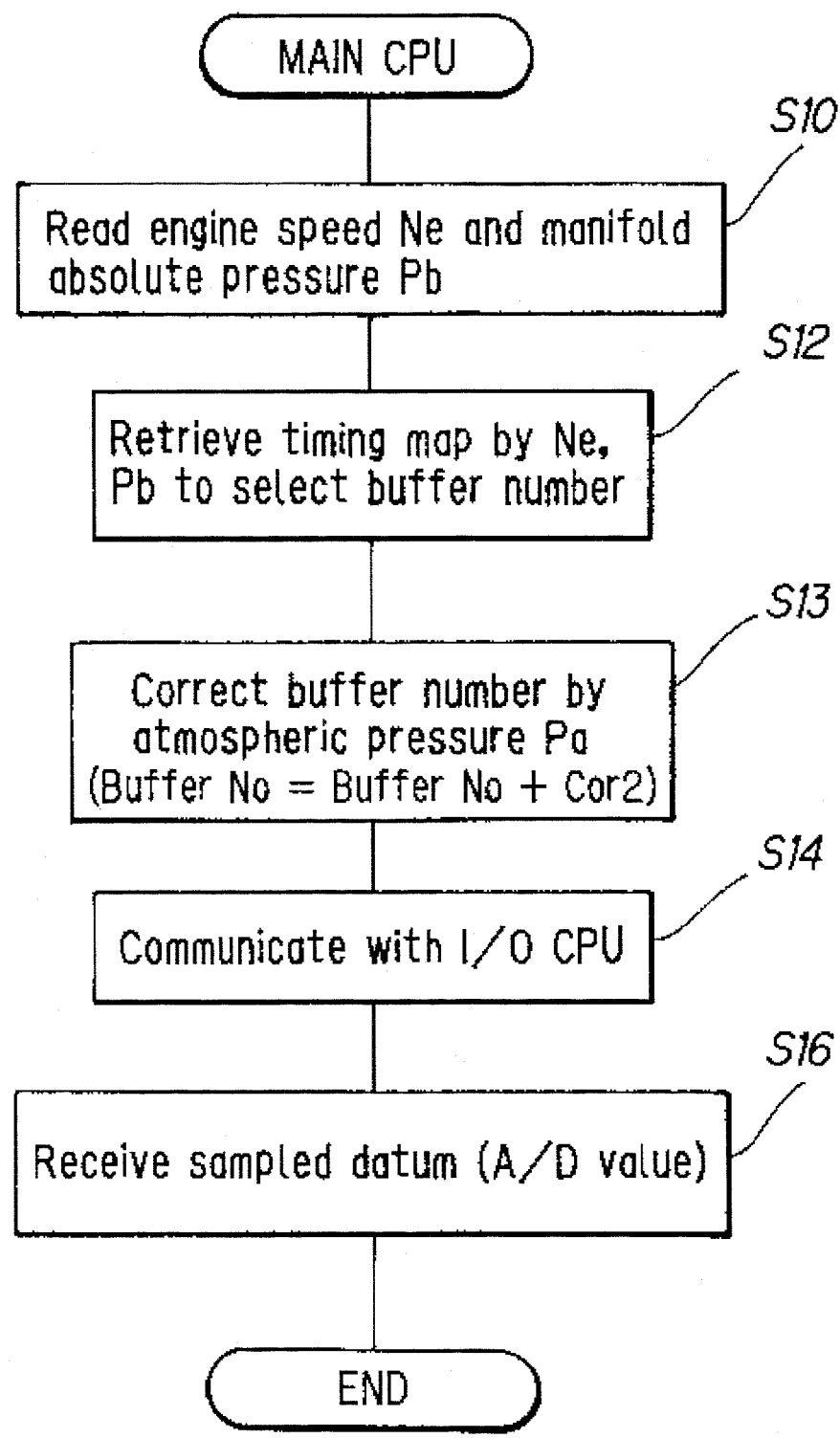
FIG. 29 is a flowchart, similar to FIG. 3, but showing a sixth embodiment of the invention.

FIG. 29 is a flowchart similar to FIG. 27, but shows a sixth embodiment of the invention. In the sixth embodiment, the sampled datum selected is corrected in response to the atmospheric pressure of the altitude of a place at which the vehicle on which the engine is mounted travels.

At high altitudes, since the pressure in the exhaust system drops due to the atmospheric pressure decreases so that the exhaust gas pressure increases, the arrival time at which the exhaust gas reaches the sensor becomes shorter than that at a low land. The sixth embodiment aims to solve the problem.

Figure 30:
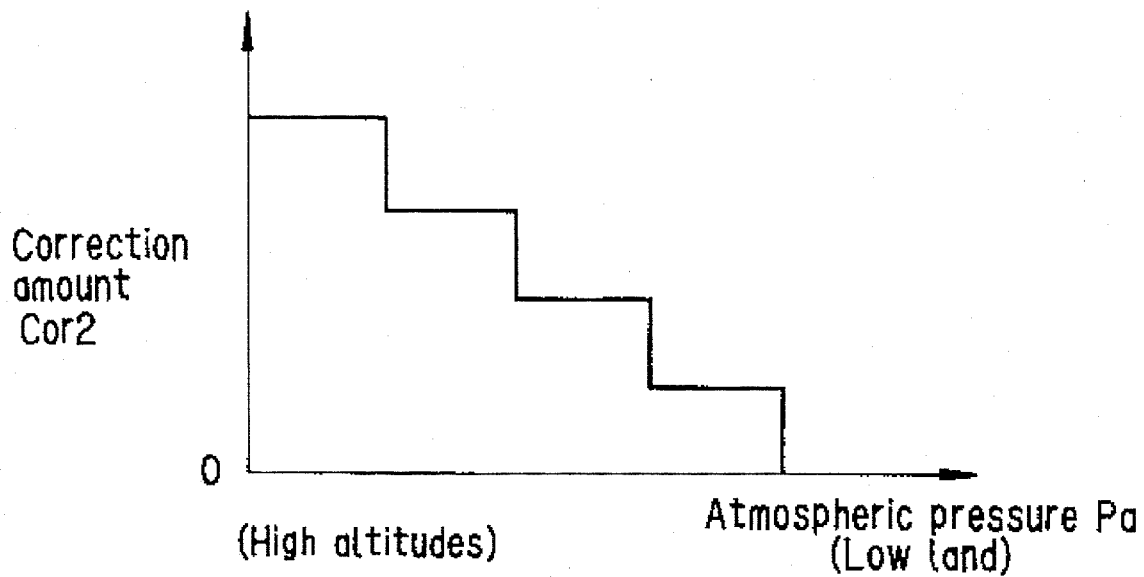
FIG. 30 is an explanatory view showing the characteristics of a correction amount referred to in the flowchart of FIG. 29.

In the flowchart of FIG. 29, the buffer number selected at step S12 is corrected by adding a correction amount Cor2 (positive value) in response to the atmospheric pressure, more correctly in response to the altitude at which the vehicle on which the engine is mounted travels. The correction is conducted such that the buffer number is increased as the altitude increases (i.e. the atmospheric pressure decreases). This means that a datum sampled at an earlier crank angular position is selected at high altitudes. FIG. 30 shows the characteristics of the correction amount Cor2. As is apparent from the figure, when the vehicle runs at a low land, the selected buffer number is left as it is. The rest is the same as the first embodiment.

With the arrangement, it becomes possible to detect the air-fuel ratio at any place including high altitudes more accurately and hence to improve the accuracy of the observer estimation conducted based on the selected datum and the accuracy of the feedback control conducted based on the estimated air-fuel ratios.

Figure 31:
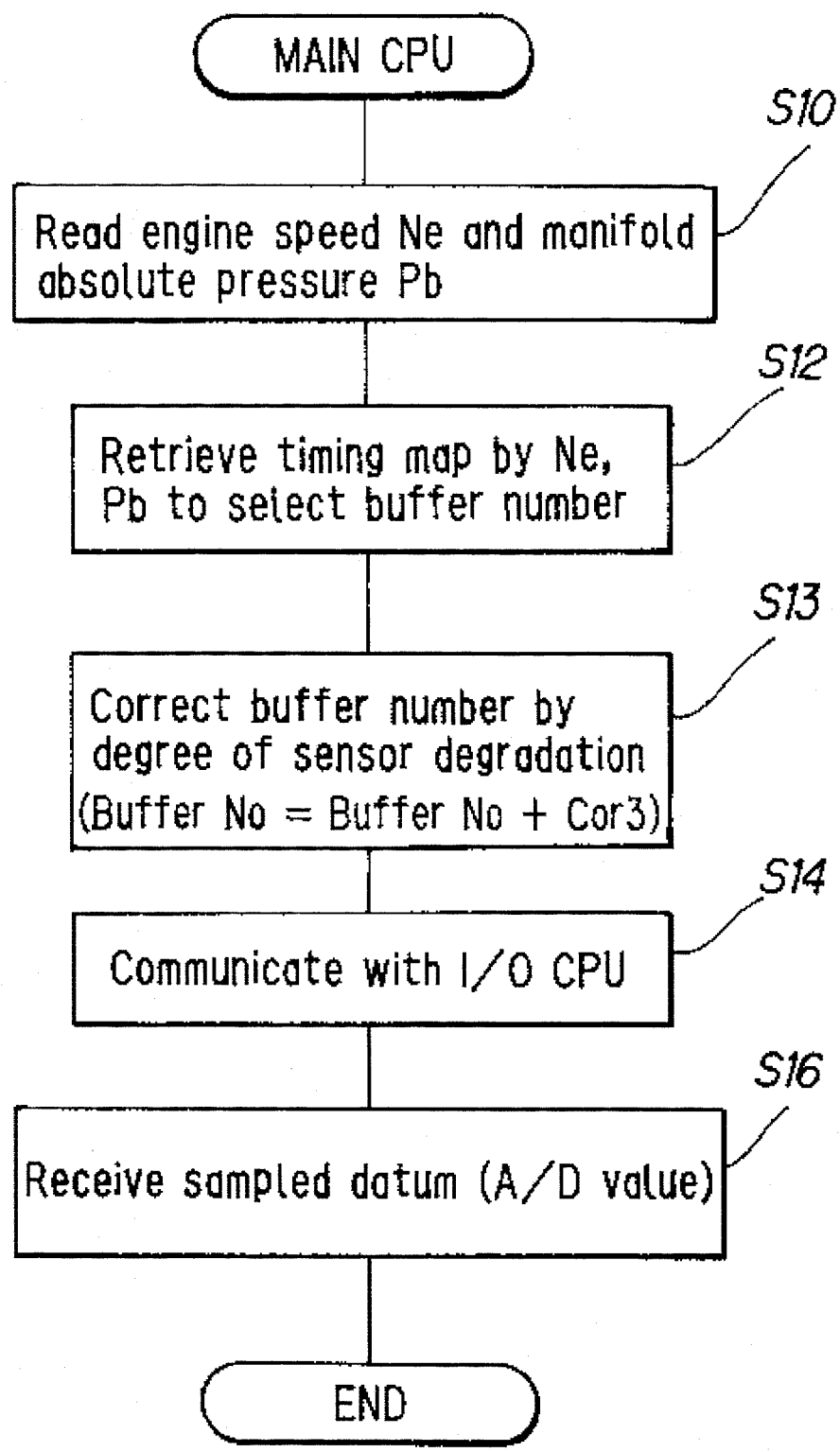
FIG. 31 is a flowchart, similar to FIG. 3, but showing a seventh embodiment of the invention.

FIG. 31 is a flowchart similar to FIG. 27, but shows a seventh embodiment of the invention. In the seventh embodiment, the sampled datum selected is corrected in response to the degradation of the LAF sensor 40.

When the LAf sensor 40 degrades, the reaction time becomes longer. More correctly, the reaction time elongates as the degree of degradation increases. As a result, it takes more time for the LAF sensor to detect the air-fuel ratio.

Figure 32:
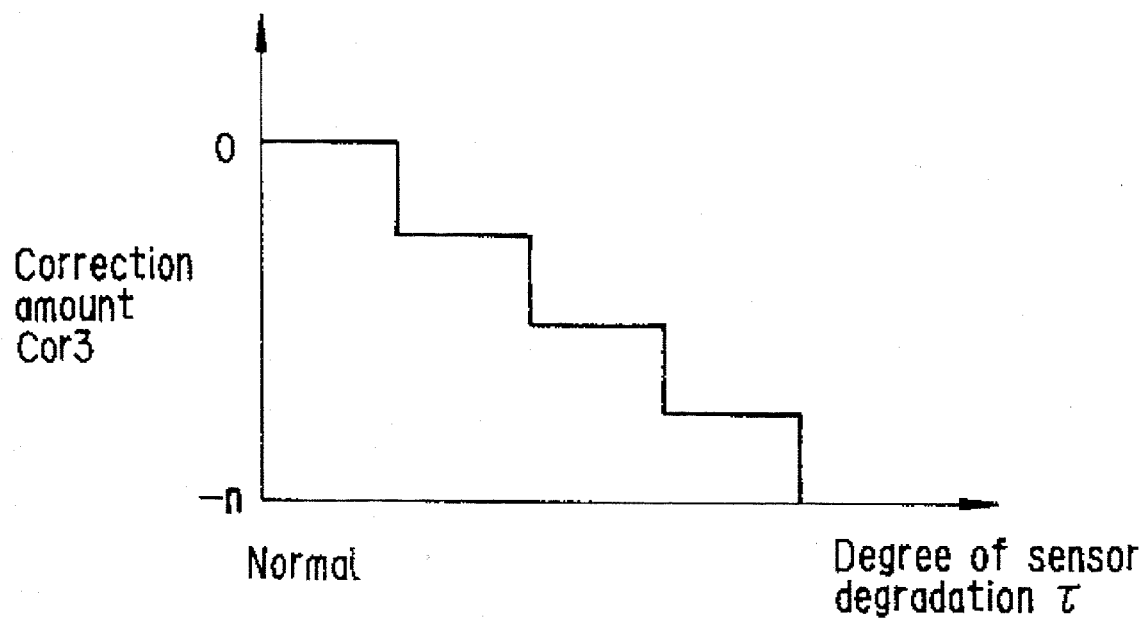
FIG. 32 is an explanatory view showing the characteristics of a correction amount referred to in the flowchart of FIG. 31.

In the flowchart of FIG. 31, the buffer number selected at step S12 is corrected by adding a correction amount Cor3, negative value, i.e by subtracting by the correction amount Cor3 in response to the degree of degradation the air-fuel ratio sensor. FIG. 32 shows the characteristics of the correction amount Cor3. As illustrated, the correction amount is made zero when the sensor is normal and increases in the minus direction and peaks at a value −n. Since the correction amount Cor3 in minus value is added, i.e. subtracted from the buffer number, a datum sampled at a later crank angular position is selected with increasing degree of degradation.

Figure 33:
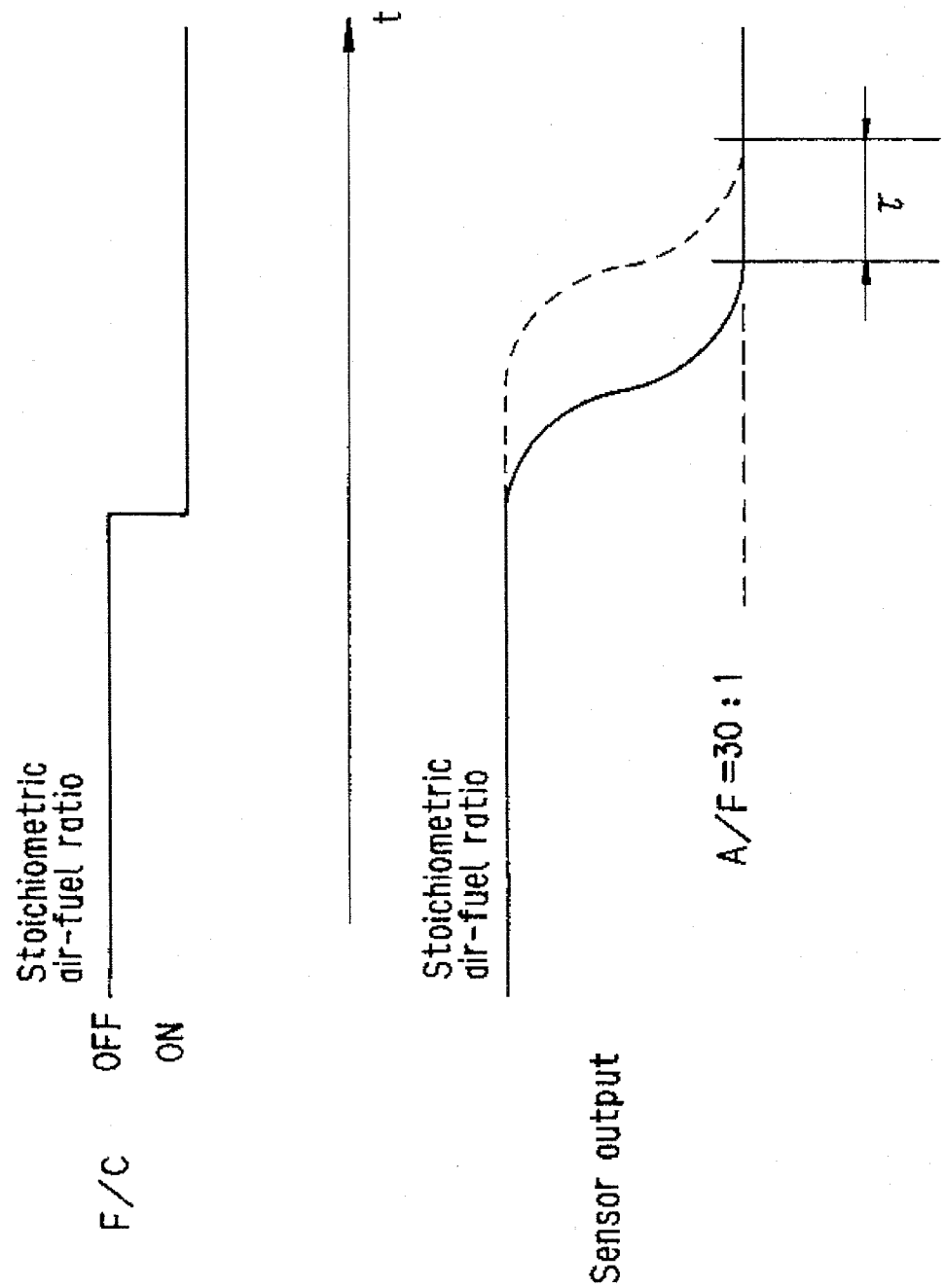
FIG. 33 is an explanatory view showing the determination of the degree of degradation of an air-fuel ratio sensor referred to in the flowchart of FIG. 31.

FIG. 33 shows one example of determining the degree of sensor degradation. Namely, when a fuel supply is cut (F/C ON), the time at which the output of a normal sensor reaches a predetermined lean value, e.g., 30.0:1 is obtained in advance through experimentation. And each time the fuel cut is made, the time is measured. As the sensor degradation progresses, the deviation $\tau$ will increases. This deviation $\tau$ will thus indicate the degree of sensor degradation. Any other methods will however be usable including one proposed by the assignee in the aforesaid application (Hei 3-169,456). The rest is the same as the first embodiment.

With the arrangement, it becomes possible to detect the air-fuel ratio irrespectively of the sensor degradation more accurately and hence to improve the accuracy of the observer estimation conducted based on the selected datum and the accuracy of the feedback control conducted based on the estimated air-fuel ratios.

It should be note that in the fifth to seventh embodiments, although the additive correction term is used, it is alternatively possible to use a correction term to be multiplied to the buffer number selected. Further, it is alternatively possible to use the value other than an integer or to use interpolation or weight averaging between buffer numbers.

Figure 34:
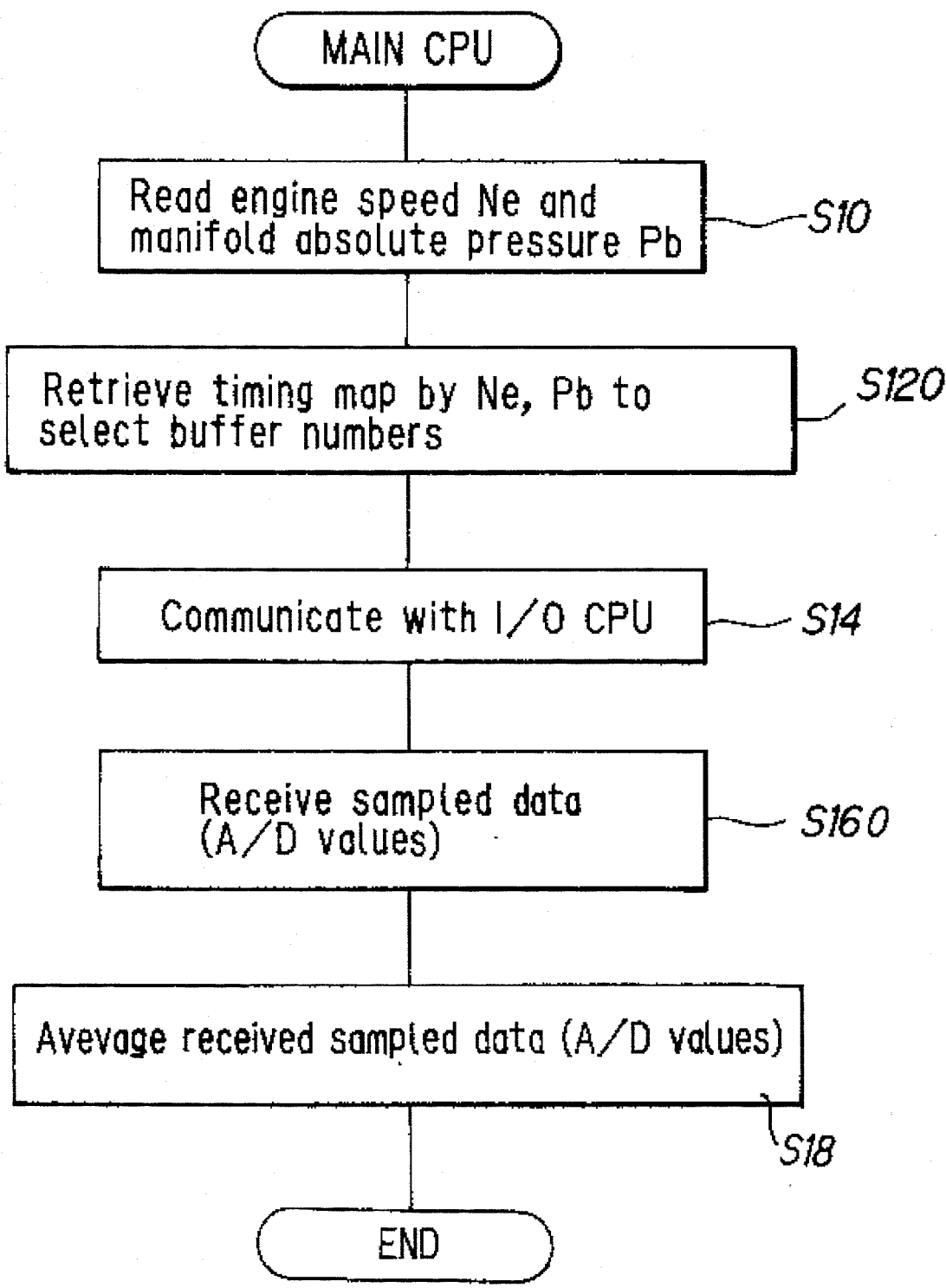
FIG. 34 is a flowchart, similar to FIG. 3, but showing an eighth embodiment of the invention.
Figure 36:
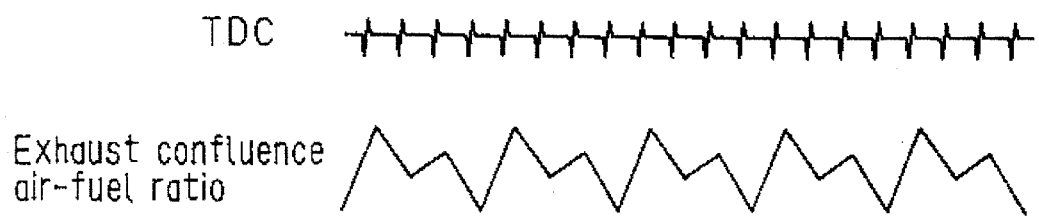
FIG. 36 is an explanatory view showing the relationship between the air-fuel ratio at the confluence point of the exhaust system of a multicylinder internal combustion engine relative to the TDC crank position.

FIG. 34 is a flowchart similar to FIG. 3, but shows an eighth embodiment of the invention.

FIG. 35 is an explanatory view of a timing map used in the eighth embodiment. In the eighth embodiment, as illustrated in the figure, a plurality of buffer numbers are stored in each address of the map defined with respect to the engine speed Ne and the manifold absolute pressure Pb.

More specifically, in the first to the seventh embodiments, a single buffer number is stored at each address in the map with respect to the engine speed and manifold absolute pressure etc. However, the sample timing considered to be best at the operating condition of the engine may shift due to the sudden change of the engine operating conditions. Similar situation will happen if the desired air-fuel ratio is lean, the engine is at altitudes or the sensor becomes degraded. When such a case may happen, however, if a plurality of data are prepared in each address, it becomes possible to determine the air-fuel ratio from data which may include the datum most suitable for the current engine operating conditions. For that reason, in the eighth embodiment, as illustrated in FIG. 35, three or four buffer numbers are stored in one address in the timing map.

In the flowchart of FIG. 34, after the engine speed or the like are read in step S12, the program proceeds to step S120 in which the timing map is retrieved by the parameters and selects a plurality of buffer numbers stored in the address, to step S16, via S14, to receive the sampled (retrieved) data, and to step. S18 in which a simple means value or a weighted mean of the sampled (retrieved) data in digital values corresponding to the retrieved buffer numbers is calculated to determine the air-fuel ratio.

With the arrangement, if the engine operating conditions abruptly change, since a mean value of a plurality of sampled data are used to determine the air-fuel ratio, more proper value can be obtained when comparing with the case in which the datum selected is inappropriate. This is applicable to the case in which the desired air-fuel ratio is lean, the engine is at high altitudes or the sensor becomes degraded. The rest of the eighth embodiment is the same as the first embodiment.

It should be noted here that, as illustrated in FIG. 35, it is possible to make it different to change the number of buffer numbers for some or all addresses, such as 3, 4 or more.

It should also be noted that the same buffer number can be overlapped in one address, such as "8,8,10,11" so as to assign the weight to the average.

It should further be noted that the buffer numbers stored are not necessarily consecutive, but can be arranged to be every second or third or more datum. It makes it possible to average data in wider range.

It should further be noted that, although the retrieved values in digital form are averaged, it is alternatively possible to average the buffer numbers stored in the address in the map and by obtaining an integer of the average in an appropriate manner, to determine a single buffer number.

It should be noted that the number of stages is not limited to six or twelve in the invention.

It should further be noted that, although the embodiments have been described with respect to examples in which a model describing the behavior of the exhaust system is built and air-fuel ratio control is conducted using an observer which observes the internal state of the model, the air-fuel ratio detection system for an internal combustion engine according to this invention is not limited to this arrangement and can instead be configured in the other manner.

It should further be noted that although the operating conditions of the engine are detected through the engine speed and manifold absolute pressure or the like, the invention is not limited to the arrangement. The parameter indicative of the engine load is not limited to the manifold absolute pressure and any other parameter such as intake air mass flow, throttle opening degree or the like is usable.

It should further be noted that although the embodiments have been explained with respect to the case of using a wide-range air-fuel ratio sensor, it is alternatively possible to use an $O_2$ sensor.

The present invention has thus been shown and described with reference to specific embodiments. However, it should be noted that the present invention is in no way limited to the details of the described arrangements but changes and modifications may be made without departing from the scope of the appended claims.

What is claimed is:

1. A system for controlling an air-fuel ratio of an internal combustion engine, comprising:
   an air-fuel ratio sensor installed at an exhaust system of said engine;
   first sensor means for detecting a parameter indicative of an operating condition of said engine;
   a circuit for receiving an output of said air-fuel ratio sensor to process the output of said air-fuel ratio sensor;
   a microprocessor means having a first memory being programmed to operate upon an output of said circuit and an output of said first sensor means to;
   successively sample a datum of said output of said circuit;
   successively store said sampled datum in the first memory;
   select one datum from among said sampled data in response to said parameter indicative of the operating condition of said engine;
   determine an air-fuel ratio of said engine based on said selected sampled datum;
   determine a fuel injection quantity to be supplied to said engine at least based on a basic quantity and the determined air-fuel ratio; said system further comprising
   a fuel injector for injecting fuel in a cylinder of said engine based on the determined fuel injection quantity.

2. A system according to claim 1, wherein said first sensor means at least detects parameters indicative of an engine speed and a manifold absolute pressure.

3. A system according to claim 2, wherein said microprocessor means is programmed to select one datum sampled at an earlier crank angular position as said engine speed decreases or said manifold absolute pressure increases.

4. A system according to claim 1, wherein said microprocessor means includes a second memory storing mapped data that identify addresses of said sample data in the first memory and said microprocessor means is programmed to retrieve the mapped data with said engine speed and manifold absolute pressure to select one data from among the sampled data.

5. A system according to claim 1, wherein
   said microprocessor means includes a second memory and is programmed to transfer at least one of said sampled data stored in said first memory to said second memory; and
   select one data from among said sampled data stored in said second memory.

6. A system according to claim 5, wherein
   said first sensor means at least detects parameters indicative of an engine speed and a manifold absolute pressure.

7. A system according to claim 6, wherein
   said microprocessor means is programmed to select one datum sampled at an earlier crank angular position as said engine speed decreases or said manifold absolute pressure increases.

8. A system according to claim 5, wherein
   said processor means is programmed to transfer said sampled data stored in said first memory to said second memory at a stretch at a predetermined crank angular position.

9. A system according to claim 1, wherein
   said engine is provided with a variable valve timing mechanism which switches at least one of a valve timing and a valve lifting between a plurality of characteristics;
   second sensor means detects the valve timing switched; and
   said microprocessor means is programmed to select one datum among from said sampled data at least in response to said detected valve timing.

10. A system according to claim 9, wherein
    said microprocessor means is programmed to select one datum sampled at an earlier crank angular position when said valve timing is switched such that an exhaust valve of said engine opens at an earlier crank angular position.

11. A system according to claim 9, wherein
    said first sensor means at least detects parameters indicative of an engine speed and a manifold absolute pressure.

12. A system according to claim 11, wherein
    said microprocessor means is programmed to select one datum sampled at an earlier crank angular position as said engine speed decreases or said manifold absolute pressure increases.

13. A system according to claim 11, wherein
    said microprocessor means is programmed to select one datum sampled at an earlier crank angular position if said valve timing is switched such that an exhaust valve of said engine opens at an earlier crank angular position, when said engine speed and manifold absolute pressure are constant.

14. A system according to claim 9, wherein said microprocessor means includes a second memory storing mapped data that identify addresses of said sampled data in the first memory and said microprocessor means is programmed to retrieve the mapped data with said engine speed and manifold absolute pressure to select one data from among sampled data.

15. A system according to claim 2, wherein
    said engine is provided with a variable valve timing mechanism which switches at least one of a valve timing and a valve lifting between a plurality of characteristics;
    second sensor means detects the valve timing switched; and
    said microprocessor means is programmed to select one datum from among said sampled data at least in response to said detected valve timing.

16. A system according to claim 15, wherein
    said microprocessor means is programmed to select one datum sampled at an earlier crank angular position when said valve timing is switched such that an exhaust valve of said engine opens at an earlier crank angular position.

17. A system according to claim 15, wherein
    said first sensor means at least detects parameters indicative of an engine speed and a manifold absolute pressure.

18. A system according to claim 17, wherein said microprocessor means is programmed to select one datum sampled at an earlier crank angular position as said engine speed decreases or said manifold absolute pressure increases.

19. A system according to claim 17, wherein
    said microprocessor means is programmed to select one datum sampled at an earlier crank angular position if said valve timing is switched such that an exhaust valve of said engine opens at an earlier crank angular position, when said engine speed and manifold absolute pressure are constant.

20. A system according to claim 1, wherein said microprocessor means is programmed to correct said selected sampled datum in response to an environmental condition of said engine.

21. A system according to claim 20, wherein
said microprocessor means is programmed to correct said selected sampled datum in response to an atmospheric pressure surrounding said engine.

22. A system according to claim 21, wherein
said microprocessor means is programmed to correct said selected sampled datum by selecting one datum sampled at an earlier crank angular position as said atmospheric pressure decreases.

23. A system according to claim 20, wherein
said microprocessor means is programmed to correct said selected sampled datum in response to a degree of degradation of said air-fuel ratio sensor.

24. A system according to claim 23, wherein
said microprocessor means is programmed to correct said selected sampled datum by selecting one datum sampled at a later crank angular position as said degree of degradation of said air-fuel ratio sensor increases.

25. A system according to claim 20, wherein said system includes an air-fuel ratio feedback control loop for correcting the fuel injection quantity using a feedback factor such that the air-fuel ratio converges to a desired air-fuel ratio; and said microprocessor means is programmed to correct said selected sampled datum in response to the desired air-fuel ratio of said engine.

26. A system according to claim 25, wherein
said microprocessor means is programmed to correct said selected sampled datum by selecting one datum sampled at a later crank angular position as said desired air-fuel ratio of said engine becomes leaner.

27. A system according to claim 1, wherein
said microprocessor means is programmed to select a plurality of said sampled data in response to said parameters indicative of the operating condition of said engine; and
determine an air-fuel ratio of said engine based on said selected plurality of sampled data.

28. A system according to claim 27, wherein
said microprocessor means is programmed to determine an average value of said selected plurality of sampled data and determine said air-fuel ratio based on said average value.

29. A system according to claim 27, wherein said microprocessor means includes a second memory storing mapped data that identify addresses of said sampled data in the first memory and said microprocessor means is programmed to retrieve the mapped data with said engine speed and manifold absolute pressure to select a plurality of said sampled data from among the sampled data.

30. A system according to claim 29, wherein each of said address has different sampled data.

31. A system according to claim 29, wherein each of said address has the same sampled data.

32. A system for controlling air-fuel ratio of an internal combustion engine, said system comprising:
an air-fuel ratio sensor installed at an exhaust system of said engine;

first means for detecting a parameter indicative of an operating condition of said engine;

a circuit for receiving an output of said air-fuel ratio sensor to process the output of the air-fuel ratio sensor;

second means for successively sampling data output from said circuit;

third means for successively storing sampled datum in a first memory;

fourth means for selecting one datum from among the sampled data in response to said parameter indicative of the operating condition of the engine;

fifth means for determining an air-fuel ratio of said engine based on said selected sampled datum;

fuel injection quantity determining means for determining a fuel injection quantity to be supplied to said engine at least based on a basic quantity and the determined air-fuel ratio;

said system further comprising
a fuel injector for injecting fuel in a cylinder of said engine based upon the determined fuel injection quantity.

33. A system according to claim 32, wherein said first means at least detects parameters indicative of an engine speed and a manifold absolute pressure.

34. A system according to claim 33, wherein said fourth means selects one datum sampled at an earlier crank angular position as said engine speed decreases or as said manifold absolute pressure increases.

35. A system according to claim 32, wherein said fourth means includes a second memory which stores mapped data which identifies addresses of sampled data in the first memory, and wherein said fifth means retrieves the mapped data with the engine speed and the manifold absolute pressure to select one data from among the sampled data.

36. A system according to claim 32, wherein said third means includes a second memory, and transfers at least one of the sampled data stored in the first memory to the second memory, and wherein the fourth means selects one datum from among the sampled data stored in the second memory.

37. A system according to claim 36, wherein said first means at least detects parameters indicative of an engine speed and a manifold absolute pressure.

38. A system according to claim 37, wherein the fourth means selects one datum sampled at an earlier crank angular position as said engine speed decreases or as said manifold absolute pressure increases.

39. A system according to claim 36, wherein said third means transfers said sampled data stored in said first memory to said second memory at a stretch at a predetermined crank angular position.

40. A system according to claim 32, wherein said engine includes a variable valve timing mechanism which switches at least one of a valve timing and, a valve lifting between a plurality of characteristics, and wherein a sixth means is provided to detect a switching of the valve timing, and wherein said fourth means selects one datum from among the sampled data at least in response to said detected valve timing.

41. A system according to claim 40, wherein said fourth means selects one datum sampled at an earlier crank angular position when said valve timing is switched such that an exhaust valve of said engine opens at an earlier crank angular position.

42. A system according to claim 40, wherein said first means at least detects parameters indicative of an engine speed and a manifold pressure.

43. A system according to claim 42, wherein said fourth means selects one datum sampled at an earlier crank angular position as said engine speed decreases or as said manifold absolute pressure increases.

44. A system according to claim 42, wherein said fourth means selects one datum sampled at an earlier crank angular position if said valve timing is switched such that an exhaust valve of said engine opens at an earlier crank angular position, when said engine speed and manifold absolute pressure are constant.

45. A system according to claim 40, wherein said fourth means includes a second memory storing mapped data that identifies addresses of said sampled data in the first memory, and wherein said fourth means retrieves the mapped data with said engine speed and said manifold absolute pressure to select one data from among the sampled data.

46. A system according to claim 32, wherein said engine is provided with a variable valve timing mechanism which switches at least one of a valve timing and a valve lifting between a plurality of characteristics, and wherein a sixth means detects a switching of said valve timing, and wherein said fourth means selects one datum from among said sampled data at least in response to said detected valve timing.

47. A system according to claim 46, wherein said fourth means selects one datum sampled at an earlier crank angular position when said valve timing is switched such that an exhaust valve of said engine opens at an earlier crank angular position.

48. A system according to claim 46, wherein said first means at least detects parameters indicative of an engine speed and a manifold absolute pressure.

49. A system according to claim 48, wherein said fourth means selects one datum sampled at an earlier crank angular position as said engine speed decreases or as said manifold absolute pressure increases.

50. A system according to claim 48, wherein said fourth means selects one datum sampled at an earlier crank angular position if said valve timing is switched such that an exhaust valve of said engine opens at an earlier crank angular position, when said engine speed and manifold absolute pressure are constant.

51. A system according to claim 32, wherein said fourth means corrects said sampled datum in response to an environmental condition of said engine.

52. A system according to claim 51, wherein said fourth means corrects said selected sampled datum in response to an atmospheric pressure surrounding said engine.

53. A system according to claim 52, wherein said fourth means corrects said selected sample datum by selecting one datum sampled at an earlier crank angular position as said atmospheric pressure decreases.

54. A system according to claim 51, wherein said fourth means corrects said selected sampled datum in response to a degree of degradation of said air-fuel ratio sensor.

55. A system according to claim 54, wherein said fourth means corrects said selected sampled datum by selecting one datum sampled at a later crank angular position as said degree of degradation of said air-fuel ratio sensor increases.

56. A system according to claim 51, wherein said system includes an air-fuel ratio feedback control loop for correcting the fuel injection quantity using a feedback factor whereby the air-fuel ratio converges to a desired air-fuel ratio; and said fourth means corrects said selected sampled datum in response to the desired air-fuel ratio of said engine.

57. A system according to claim 56, wherein said fourth means corrects said selected sampled datum by selecting one datum sampled at a later crank angular position as said desired air-fuel ratio of said engine becomes leaner.

58. A system according to claim 32, wherein said fourth means selects a plurality of said sampled data in response to said parameters indicative of the operating condition of said engine; and said fifth means detects said air-fuel ratio of said engine based on said selected plurality of sampled data.

59. A system according to claim 58, wherein said fourth means determines an average value of selected plurality of sampled data and determines said air-fuel ratio based upon said average value.

60. A system according to claim 58, wherein said fourth means includes a second memory storing mapped data which identifies addresses of said sampled data in the first memory, and wherein said fourth means retrieves the mapped data with said engine speed and manifold absolute pressure to select a plurality of said sampled data from among the sampled data.

61. A system according to claim 60, wherein each of said addresses has different sampled data contained therein.

62. A system according to claim 60, wherein each of said addresses has a same sampled data.

* * * * *